(12) United States Patent
Van De Sluis et al.

(10) Patent No.: US 10,334,871 B2
(45) Date of Patent: Jul. 2, 2019

(54) SYSTEM, DISPOSABLE CARTRIDGE, AND METHOD FOR THE PREPARATION OF A LIQUID PRODUCT

(71) Applicant: Apiqe Holdings, LLC, Torrance, CA (US)

(72) Inventors: Jasper Jacobus Van De Sluis, El Utrecht (NL); Roland Waldemar Verbeek, Nd Huizen (NL)

(73) Assignee: Apiqe Holdings, LLC, Torrance, CA (US)

( * ) Notice: Subject to any disclaimer, the term of this patent is extended or adjusted under 35 U.S.C. 154(b) by 0 days.

(21) Appl. No.: 15/526,950

(22) PCT Filed: Nov. 17, 2015

(86) PCT No.: PCT/US2015/061123
§ 371 (c)(1),
(2) Date: May 15, 2017

(87) PCT Pub. No.: WO2016/081477
PCT Pub. Date: May 26, 2016

(65) Prior Publication Data
US 2017/0355585 A1    Dec. 14, 2017

(30) Foreign Application Priority Data

Nov. 17, 2014  (NL) ...................................... 2013824
Dec. 9, 2014   (NL) ...................................... 2013947

(51) Int. Cl.
*B67D 1/00*   (2006.01)
*A47J 31/40*  (2006.01)
*A23L 2/52*   (2006.01)
*B65D 85/804* (2006.01)
*A47J 31/36*  (2006.01)
*A23L 2/54*   (2006.01)

(52) U.S. Cl.
CPC .................................... *A23L 2/52* (2013.01); *A23L 2/54* (2013.01); *A47J 31/3628* (2013.01);
(Continued)

(58) Field of Classification Search
CPC ............................. B67D 1/0001; A47J 31/407
(Continued)

(56) References Cited

U.S. PATENT DOCUMENTS 4,808,346 A     2/1989  Strenger
8,635,945 B2 *  1/2014  Verbeek ................. A47J 31/44
                                                      99/295

(Continued)

FOREIGN PATENT DOCUMENTS

WO   WO-2005/077811 A2   8/2005
WO   WO-2007/114685 A1   10/2007
(Continued)

OTHER PUBLICATIONS

International Search Report and Written Opinion for PCT/US2015/061123, dated Jul. 20, 2016, 21 pages.

*Primary Examiner* — Dana Ross
*Assistant Examiner* — Lawrence H Samuels
(74) *Attorney, Agent, or Firm* — Blank Rome LLP

(57) ABSTRACT

A system for the preparation of a liquid product has a dispensing apparatus and a disposable cartridge. The cartridge includes a reservoir filled with a single serve portion of a liquid ingredient to be combined with a base liquid, one or more dispensing passages, and a sealing film that covers the reservoir. The apparatus has a pressurization dome member with a peripheral gas seal adapted to sealingly engage the cartridge around a location where one or more openings are created in the sealing film. A pressurized gas source is connected to the dome member. The apparatus feeds pressurized gas beneath the dome member, to allow the liquid ingredient to be pressurized via the one or more openings in the sealing film, to assist dispensing of the liquid ingredient from the reservoir via the one or more dispensing passages.

24 Claims, 26 Drawing Sheets

Figure 1:
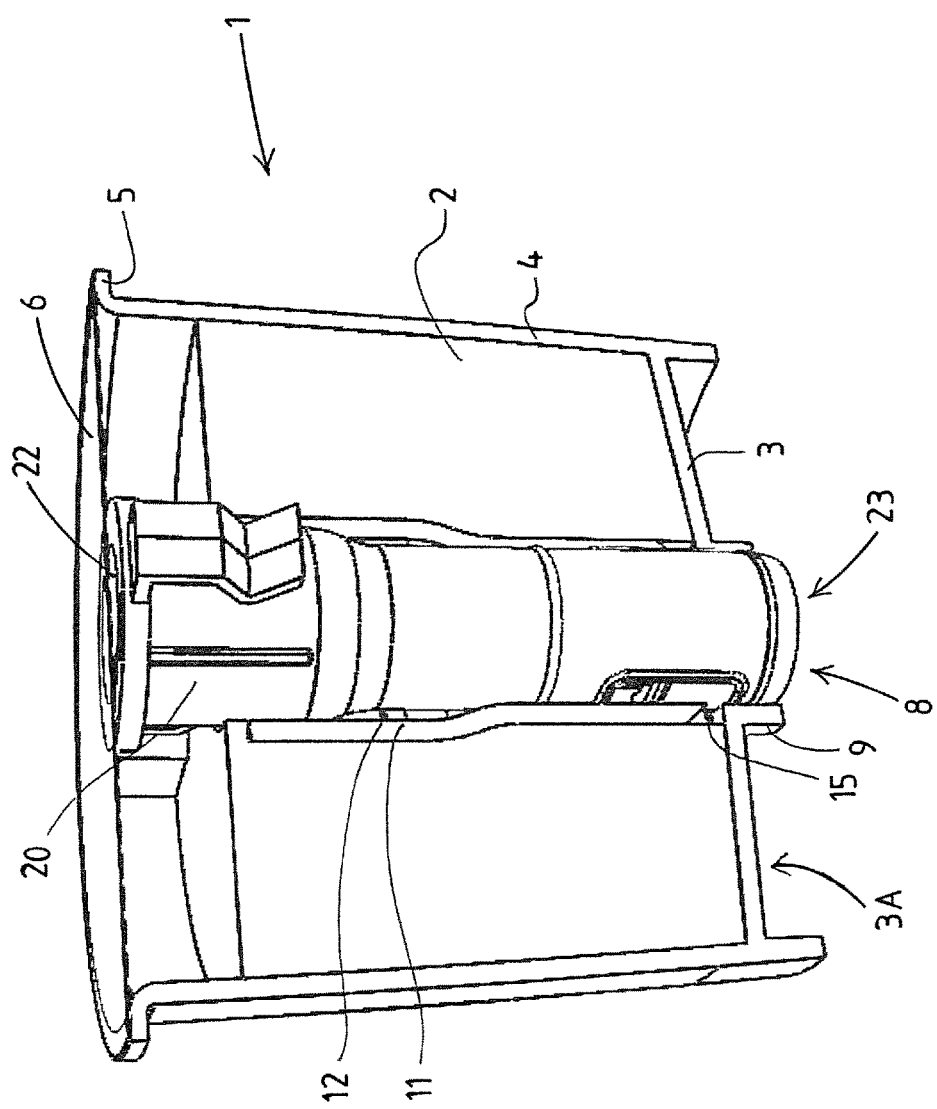

(52) U.S. Cl.
CPC ......... *A47J 31/3695* (2013.01); *A47J 31/407* (2013.01); *B65D 85/804* (2013.01); *B65D 85/8043* (2013.01); *B67D 1/0004* (2013.01); *B67D 1/0078* (2013.01)

(58) Field of Classification Search
USPC ............................... 99/283, 295, 302 R, 323
See application file for complete search history.

(56) References Cited

U.S. PATENT DOCUMENTS

| | | | | |
|---|---|---|---|---|
| 8,808,775 | B2* | 8/2014 | Novak | .................. A47J 31/407 426/477 |
| 9,572,451 | B2* | 2/2017 | Verbeek | .............. A47J 31/3676 99/323.2 |
| 2009/0223375 | A1* | 9/2009 | Verbeek | .................. A47J 31/41 99/295 |
| 2011/0226343 | A1* | 9/2011 | Novak | ..................... A47J 31/41 426/394 |
| 2014/0053735 | A1* | 2/2014 | Verbeek | .......................... 99/295 |
| 2014/0076170 | A1* | 3/2014 | Epars | ...................... A47J 31/46 99/295 |
| 2014/0331868 | A1 | 11/2014 | Novak et al. | |
| 2015/0125586 | A1 | 5/2015 | Ergican | |

FOREIGN PATENT DOCUMENTS

| | | | |
|---|---|---|---|
| WO | WO-2011/138405 A1 | 11/2011 | |
| WO | WO-2011138405 A1 * | 11/2011 | .......... A47J 31/0668 |

* cited by examiner

SYSTEM, DISPOSABLE CARTRIDGE, AND METHOD FOR THE PREPARATION OF A LIQUID PRODUCT The present application is a national phase of PCT/US2015/061123 which claims priority to Dutch Application No. NL 2013824 entitled "DISPOSABLE CARTRIDGE FILLED WITH A SINGLE SERVE PORTION OF A LIQUID INGREDIENT TO BE COMBINED WITH A BASE LIQUID FOR THE PREPARATION OF A LIQUID PRODUCT", filed on Nov. 17, 2014, and to Dutch Application No. NL 2013947 entitled "SYSTEM, DISPOSABLE CARTRIDGE, AND METHOD FOR THE PREPARATION OF A LIQUID PRODUCT", filed on Dec. 9, 2014, and assigned to the assignee hereof. The contents of these applications are hereby incorporated by reference.

The present invention relates to a system and to a disposable cartridge filled with a single serve portion of a liquid ingredient to be combined with a base liquid for the preparation of a liquid product, e.g. a liquid food product suitable for human consumption, e.g. a beverage concentrate to be combined with water, e.g. carbonated water, for the preparation of a beverage.

Examples of disposable cartridge based beverage preparation systems are for example disclosed in U.S. Pat. No. 4,808,346, WO2005/077811, WO2007/114685, US2014/0331868, and US2015/0125586.

The present invention aims to provide improvements or at least useful alternatives. For example prior art systems have unsatisfactory results when it comes to the preparation of a carbonated beverage, e.g. in comparison to the same beverage being dispensed from a bottle or can. Also for example the need exists for cartridges that are easy to handle by consumers and/or are attractive in view of mass production and costs.

According to a first aspect thereof the present invention relates to a system for the preparation of a liquid product, e.g. a liquid food product, e.g. a beverage, which system comprises:

a) a disposable cartridge filled with a single serve portion of a liquid ingredient to be combined with a base liquid for the preparation of a liquid product, e.g. a beverage concentrate to be combined with water, e.g. carbonated water, for the preparation of a beverage, the disposable cartridge comprising:

a cartridge body with a bottom and a top, the body delimiting a reservoir that is filled with a single serve portion of a liquid ingredient, wherein the cartridge body has an aperture in communication with said reservoir, which aperture is hermetically sealed by a sealing film, e.g. a top sealing film, said sealing film having a portion that covers said reservoir, wherein cartridge body is provided with one or more dispensing passages arranged to dispense the liquid ingredient from the reservoir, b) a dispensing apparatus, e.g. a beverage dispensing apparatus, the apparatus comprising:

a holder adapted to accommodate and retain the disposable cartridge at a dispensing location in the apparatus, a pressurized gas source, preferably a pressurized air source, e.g. an air pump, wherein the apparatus is adapted to bring said pressurized gas source in direct communication with the reservoir of the disposable cartridge so as to allow said liquid ingredient therein to be pressurized by said gas thereby assisting the dispensing thereof from the reservoir via said one or more dispensing passages, wherein the system is adapted to create one or more openings in said portion of the sealing film that covers the reservoir.

A system for the preparation of a liquid product, e.g. a liquid food product, e.g. a beverage, which system comprises:

a) a disposable cartridge filled with a single serve portion of a liquid ingredient to be combined with a base liquid for the preparation of a liquid product, e.g. a beverage concentrate to be combined with water, e.g. carbonated water, for the preparation of a beverage, the disposable cartridge comprising:

a cartridge body with a bottom and a top, the body delimiting a reservoir that is filled with a single serve portion of a liquid ingredient, wherein the cartridge body has an aperture in communication with said reservoir, which aperture is hermetically sealed by a sealing film, e.g. a top sealing film, said sealing film having a portion that covers said reservoir, wherein cartridge body is provided with one or more dispensing passages arranged to dispense the liquid ingredient from the reservoir, b) a dispensing apparatus, e.g. a beverage dispensing apparatus, the apparatus comprising:

a holder adapted to accommodate and retain the disposable cartridge at a dispensing location in the apparatus, a pressurized gas source, preferably a pressurized air source, e.g. an air pump, wherein the apparatus is adapted to bring said pressurized gas source in direct communication with the reservoir of the disposable cartridge so as to allow said liquid ingredient therein to be pressurized by said gas thereby assisting the dispensing thereof from the reservoir via said one or more dispensing passages, and wherein the system is adapted to create one or more openings in said portion of the sealing film that covers the reservoir, is disclosed in WO2011138405. In an embodiment disclosed therein the base liquid feed lance of the dispensing apparatus is equipped with an additional air pressure lance that pierces a corresponding hole in the annular portion of the top film which overlies the reservoir, so outside of the column in which the valve member is arranged. This air pressure lance is connected to a pressurized air source. A drawback thereof is that the air pressure lance needs to sealingly fit through the hole that is pierced in the top sealing film in order to allow the creation of a controlled air pressure within the reservoir. This is very difficult to achieve in practice.

An alternative embodiment in WO2011138405 integrates an air duct in the base liquid feed lance such that this air duct is introduced into the bore of the column as the valve is moved down and then internally connects to a small hole in the column so as to allow entry of air into the reservoir. The latter embodiment does not create one or more openings in said portion of the sealing film that covers the reservoir and requires a complex design of the cartridge and of the feed lance.

The first aspect of the invention aims to provide an improved or at least alternative pressurization approach for the liquid ingredient in the reservoir.

The first aspect of the invention provides a system for the preparation of a liquid product, e.g. a liquid food product, e.g. a beverage, which system comprises:

a) a disposable cartridge filled with a single serve portion of a liquid ingredient to be combined with a base liquid for the preparation of a liquid product, e.g. a beverage concentrate to be combined with water, e.g. carbonated water, for the preparation of a beverage, the disposable cartridge comprising:
  a cartridge body with a bottom and a top, the body delimiting a reservoir that is filled with a single serve portion of a liquid ingredient,
  wherein the cartridge body has an aperture in communication with said reservoir, which aperture is hermetically sealed by a sealing film, e.g. a top sealing film, said sealing film having a portion that covers said reservoir,
  wherein cartridge body is provided with one or more dispensing passages arranged to dispense the liquid ingredient from the reservoir,
  b) a dispensing apparatus, e.g. a beverage dispensing apparatus, the apparatus comprising:
    a holder adapted to accommodate and retain the disposable cartridge at a dispensing location in the apparatus,
    a pressurized gas source, preferably a pressurized air source, e.g. an air pump,
  wherein the apparatus is adapted to bring said pressurized gas source in direct communication with the reservoir of the disposable cartridge so as to allow said liquid ingredient therein to be pressurized by said gas thereby assisting the dispensing thereof from the reservoir via said one or more dispensing passages,
  wherein the system is adapted to create one or more openings in said portion of the sealing film that covers the reservoir, that is characterized in that the dispensing apparatus further comprises a pressurization dome member having a peripheral gas seal, e.g. along a periphery thereof an outer gas seal member, which is adapted to sealingly engage the disposable cartridge around a location where said one or more openings are created in said sealing film to allow entry of said pressurized gas into the reservoir,
  and in that the pressurized gas source is connected to said dome member and is adapted to feed pressurized gas beneath said dome member within the contour of the peripheral gas seal sealingly engaging the disposable cartridge, so as to allow said liquid ingredient in said reservoir to be pressurized by said gas via the one or more openings in said sealing film, thereby assisting the dispensing of the liquid ingredient from the reservoir via said one or more dispensing passages.

The inventive design allows for a reliable and effective gas pressurization of the liquid ingredient in the reservoir.

The first aspect of the invention also relates to a method for the preparation of a liquid product, e.g. a liquid food product, e.g. a beverage, wherein use is made of a system as described herein, wherein the method comprises:
  sealingly engaging the peripheral gas seal of the pressurization dome member with the disposable cartridge around a location where the sealing film is or will be opened to allow entry of pressurized gas into the reservoir, e.g. onto an upper end of a circumferential wall of the disposable cartridge,
  causing the sealing film to open,
  feeding pressurized gas beneath said dome member thereby pressurizing the liquid ingredient in the reservoir of the disposable cartridge by said gas thereby assisting the dispensing thereof from the reservoir via said one or more dispensing passages.

In an embodiment the dome member is provided along a periphery thereof with an outer gas seal, wherein this outer gas seal is embodied to seal onto an upper end of a circumferential wall of the disposable cartridge. For example, as preferred, said upper end is circular and the gas seal is also circular.

In the present context, reference to a dome member is not intended to imply any particular shape but merely the fact that the dome member is capable of sustaining a gas pressure in a space beneath the dome member. The dome member and its respective seal or seals may be capable of sealing the region beneath the dome member to a pressure of e.g. 4 bar.

It will be appreciated that the gas source should be able to supply pressurized gas, e.g. air by an air pump, at a flow rate that compensates for the discharge of liquid ingredient from the reservoir of the cartridge, e.g. at a rate of between 2-3 ml per second.

In embodiment the pressurized gas, e.g. air, is at a pressure of between 0.5-2.5 bar above atmospheric pressure.

It will be appreciated that the practical flow rate and pressure range can be achieved with a fairly simple air pump.

For example the reservoir holds between 20 and 75 ml of liquid ingredient, e.g. 50 ml.

For example a dispensing or serving cycle wherein a drinking glass or the like is filled with beverage, e.g. of a volume of 200-300 ml, lasts between 15 and 30 seconds.

In an embodiment, after or at the end of completion of the discharge of liquid ingredient from the reservoir, the gas may be used to purge the one or more dispensing passages, e.g. with a final boost of air, so as to avoid that residue remains in said passages.

Preferably the liquid ingredient is directly exposed to the pressurized gas, e.g. a head space in the cartridge above a liquid surface being brought in communication with the pressurized gas source. It is however not excluded that indirect contact via a membrane may be implemented, should this be preferable and the skilled person will be aware as to how this might be achieved.

In an embodiment the cartridge has a circumferential wall with an upper end, e.g. embodied with an outwardly protruding flange, said upper end bounding said aperture closed by the sealing film, wherein the peripheral gas seal of the dome member is embodied to seal onto said upper end. This allows the gas sealing to benefit from the strength or robustness of the wall of the cartridge around the aperture closed by the sealing film compared to a gas sealing that acts onto a non-supported portion of the sealing film. Also, should a tear or the like already be present in the sealing film, e.g. by inadvertent action of a user, this will not impair the operation of the gas pressurization.

In an embodiment the dispensing apparatus further comprises a base liquid feed assembly with a base liquid feed member, e.g. a lance, disposed at the dispensing location, which base liquid feed member is embodied to connect to a channel of the cartridge, so that base liquid can be fed into the channel, wherein the dispensing apparatus has an operable displacement device which is adapted to produce a movement of the holder for the cartridge and the base liquid feed member relative to each other, so that when the displacement device is operated the base liquid feed member connects to the channel.

In an embodiment the dome member and the base liquid feed member are integrated so as to move in unison by means of the operable displacement device.

In an embodiment the base liquid feed member is a base liquid feed lance which protrudes from the pressurization dome member, preferably within the contour of the peripheral gas seal.

In an embodiment the cartridge has a base liquid channel with an inlet and the base liquid feed member is arranged within the contour of the peripheral gas seal and is adapted to sealingly engage the channel, e.g. the top end of the column, so as to act as gas seal, e.g. provided with a gas seal member, that prevents entry of pressurized gas into the channel.

In an embodiment the cartridge body comprises a column which has a portion that projects upwards from the bottom, wherein the channel extends through the column from an inlet of the channel at a top end of the column, e.g. said top end being sealed to said sealing film, to a dispensing aperture at the bottom of the cartridge, wherein the base liquid feed member is adapted to connect to said inlet of the channel so that base liquid fed into the channel travels through the channel and exits the channel via the dispensing aperture.

In this context, flow of the base liquid, e.g. carbonated water, through the channel without impediment or construction may be defined as requiring the channel to have a cross-sectional area from inlet to outlet e.g. from top to bottom of the cartridge that is at no point smaller than 30 mm2, preferably always greater than 40 mm2 and even greater than 50 mm2. In general, the channel will not be greater than 200 mm2 in cross section.

In an embodiment the peripheral gas seal of the dome member is a lip seal member having an inwardly directed resilient lip portion engaging the sealing film, preferably at or near the contour of the aperture in the cartridge body, said inwardly directed resilient lip portion being exposed to said pressurized gas so as to aid in the sealing engagement with the cartridge. In another embodiment the gas seal is an O-ring or similar, yet a lip seal member allows for an effective seal without requiring a significant clamping of the lip seal, thereby facilitating a simple structure of the apparatus.

In an embodiment the operable displacement assembly comprises an electric motor, e.g. with a rotary output shaft, e.g. said rotary output shaft connected to an excenter mechanism that reciprocates the integrated dome member and base liquid feed member, e.g. between a raised and lower position thereof relative to the cartridge in its dispensing location.

In an alternative embodiment the operable displacement assembly comprises a pneumatic motor, e.g. a pneumatic piston, to which pressurized gas, e.g. air, is supplied by an air pump. For example the apparatus has a single air pump that is connected to the dome member to pressurize the liquid ingredient, e.g. as discussed herein, and also connected to said pneumatic motor, e.g. with the provision of a valve assembly to direct the pressurized air to the motor or to the dome member. The provision of a single air pump in conjunction with a pneumatic motor for the operable displacement assembly allows to do away with an additional motor just for the operable displacement assembly. For example the dome member with the integrated liquid feed member is embodied as a pneumatic piston that is slidable in a corresponding cylinder.

In an embodiment the cartridge body comprises a column which is movable inwards, e.g. downwards, from an initial position to a dispensing position, which column is sealed to said sealing film, wherein the channel extends through the column from an inlet of the channel at a top end of the column, and wherein the base liquid feed member is adapted to connect to said inlet of the channel and to engage the column allowing to feed said base liquid into the channel and to move said column to said dispensing position by operation of said operable displacement device.

In a further development thereof the portion of the sealing film covering the reservoir is provided with one or more premade score lines, e.g. by laser machining or otherwise partly through the thickness of the film, which are embodied such that pressing the column inward, e.g. downward, to said dispensing position causes said one or more premade score lines to rupture thereby providing said one or more openings that allow said introduction of pressurized gas into the reservoir in order to assist dispensing of said liquid ingredient. This embodiment allows, as is preferred, to dispense with any piercing or rupturing member, at least on the dome member, to create said one or more openings for the gas pressure to the reservoir. This is advantageous, e.g. in that any piercing or rupturing member coming from the outside and piercing through this film will be contaminated by liquid ingredient in the reservoir, e.g. as it is stuck to the inside of the film. In a practical embodiment the sealing film may be sealed to a top end of a circumferential wall of the cartridge, with the base liquid feed member pressing inwards a central area of the sealing film, e.g. by pressing onto the column, so that the film will be stressed and suitable score lines will rupture.

In an embodiment, possibly in combination with the provision of the above one or more score lines, the cartridge is provided with one or more piercing members that are arranged underneath the portion of the sealing film that covers the reservoir, so that pressing the sealing film inward, e.g. downward, causes said one or more piercing members to engage the sealing film and locally rupture the sealing film thereby providing one or more openings that allow said introduction of pressurized gas into the reservoir in order to assist dispensing of said liquid ingredient. Again this embodiment allows to, as preferred, dispense with any piercing or rupturing member coming from the outside and piercing through this film will be contaminated by liquid ingredient in the reservoir, e.g. as it is stuck to the inside of the film. In a further development thereof the cartridge body comprises a column which is movable inwards, e.g. downwards, from an initial position to a dispensing position, which column is sealed to said sealing film, wherein the channel extends through the column from an inlet of the channel at a top end of the column, wherein the base liquid feed member is adapted to connect to said inlet of the channel and to engage the column allowing to feed said base liquid into the channel and to move said column to said dispensing position by operation of said operable displacement device, and wherein said one or more piercing members locally rupture the sealing film when the column is move to said dispensing position.

In an embodiment of a cartridge with a column having a channel for the base liquid, it is envisaged that the cartridge may have a flexible bottom portion so that the column is movable downwards from a higher initial position to a lower dispensing position by means of the base liquid feed member, wherein the column has a dispensing aperture for the base liquid at the bottom, and wherein the one or more dispensing passage outlets of the cartridge are arranged at said bottom side of the cartridge and spaced from the dispensing aperture so that liquid ingredient emerges from said one or more dispensing passage outlets as a flow or flows distinct from the stream of base liquid emerging from the dispensing aperture of the channel, and wherein the one or more dispensing passage outlets are arranged so that liquid ingredient emerging therefrom adjoins the outside of the base liquid stream that has emerged from the dispensing aperture.

In an embodiment the one or more dispensing passage outlets of the cartridge are arranged at a height that corresponds to the height of the dispensing aperture or a height above the dispensing aperture. This arrangement causes the flow or flows of liquid ingredient to emerge from said outlets without undue interference by the stream of base liquid emerging from the dispensing aperture, so that said flow or flows can then gently join said base liquid stream from the outside thereof.

In an embodiment the one or more dispensing passage outlets are initially sealed by a bottom sealing film of the cartridge, e.g. said bottom sealing film being the sole closure of the one or more dispensing passage outlets, wherein the motion of the column to said lower dispensing position thereof causes the bottom sealing film of the cartridge to rupture and/or tear away from one or more dispensing passage outlets initially sealed by said bottom sealing film, and thereby to allow the dispensing from the cartridge. This arrangement allows for a practical opening of the outlets without the user having to take any action.

Preferably the bottom sealing film has a premade hole aligned with the dispensing aperture for the base liquid, wherein a circular region of the bottom sealing film around said hole lies over the one or more outlets of the dispensing passages and is sealed to a face wherein said outlets are present, e.g. the front end face of a tubular protruding foot portion of the column. In an embodiment the column has a foot portion that protrudes from the bottom of the cartridge and this foot portion is then made to protrude into and through the premade hole, with said hole being expanded in the process, so as to shear the sealing film away from the outlets of the dispensing passages.

In an embodiment the one or more dispensing passage outlets are arranged so that the liquid ingredient emerging therefrom adjoins the outside of the base liquid stream that has emerged from the dispensing aperture as an annular shroud around said base liquid stream. The dispensing passage outlets may, to this effect define a single annular outlet or multiple outlets disposed around the dispensing aperture.

This allows for a gentle combination of the liquid ingredient with the base liquid, which is e.g. of relevance if carbonated water is used as base liquid. Also the shrouding avoids that a user can see a stream of plain base liquid, which would be detrimental to user appreciation of the beverage. The shroud of liquid ingredient is preferably directed parallel and very close to the emerging base liquid stream, so that the joining or merging entails no collision of the liquid ingredient with the base liquid stream in order to avoid, when using carbonated water, an undue loss of carbon dioxide or other gas from the base liquid. Although reference here is made to an annular shroud and annular dispensing passage outlet, it will be understood that the base liquid stream need not be circular in cross section and could be oval, elongate, multi-lobal or any other shape that achieved the desired joining or merging with the liquid ingredient while avoiding undue release of carbon dioxide.

In an embodiment the cartridge or a lower portion of a column of the cartridge that protrudes below the bottom of the cartridge, e.g. below a flexible portion of the bottom, has a dispensing aperture for a stream of base liquid, wherein the cartridge body is provided with a series of dispensing passage outlets which are arranged in a circular arrangement around said base liquid dispensing aperture so as to dispense the liquid ingredient as an annular shroud around the base liquid stream emerging from the dispensing aperture. Although reference here is made to an annular shroud and annular dispensing passage outlet, it will be understood that the base liquid stream need not be circular in cross section and could be oval, elongate, multi-lobal or any other shape that achieved the desired joining or merging with the liquid ingredient while avoiding undue release of carbon dioxide.

In an embodiment the dispensing apparatus is adapted to pressurize the liquid ingredient in the reservoir so that the one or more streams of liquid ingredient emerging from the one or more dispensing passage outlets flow as a slow flow along with the base liquid stream emerging from the dispensing aperture of the channel, which slow flow adjoins the outside of the base liquid stream. So even when using gas pressurization of the reservoir it is proposed that the flow of liquid ingredient that joins the liquid stream, e.g. the exterior of said liquid stream, is slow and preferably parallel to the base liquid stream. Again this is seen as most favoured for use with carbonated water.

In an embodiment the one or more dispensing passages are embodied as flow resistor for the liquid ingredient passing there through. This arrangement allows to create a stable flow rate of liquid ingredient through the one or more dispensing passages, e.g. in view of the desire to dispense the total volume of liquid ingredient substantially in an even manner over the entire dispensing cycle, e.g. so that at no point in time plain base liquid is deposited in a drinking vessel which would be detrimental to user appreciation and beverage quality.

In an embodiment an inlet of a dispensing passage is oriented at an angle relative to the adjoining portion of the dispensing passage such that a jet of liquid ingredient emerging from the inlet due to the gas pressurization of the liquid ingredient collides against a wall of said adjoining portion of the dispensing passage thereby reducing, preferably annihilating, the speed of said jet. This embodiment allows for a significant pressure drop over the inlet, which allows the use of a gas pressure that is effectively controllable and without variation therein having significant impact on the flow rate of the liquid ingredient.

In an embodiment an inlet of a dispensing passage is embodied to cause the liquid ingredient, due to the gas pressurization, to emerge from said inlet as a jet into an adjoining portion of the dispensing passage, wherein dispensing passage is embodied to reduce the speed of said jet of liquid ingredient so that the liquid ingredient streams down slowly to the dispensing passageway, e.g. mainly under the influence of gravity, from the dispensing passageway outlet, e.g. wherein the dispensing passage comprises one or more bends. This embodiment allows for a significant pressure drop over the inlet, which allows the use of a gas pressure that is effectively controllable and without variation therein having too much impact on the flow rate of the dispensing of liquid ingredient.

In an embodiment the holder is a drawer comprising a cavity for receiving the cartridge therein, e.g. said cartridge being suspended in said cavity by an outward flange of a circumferential wall of the cartridge body, which drawer is movable into a housing of the apparatus so that the cartridge is movable into the dispensing location.

In an embodiment the operable displacement device is adapted to move the pressurization dome member as well as the base liquid feed member, e.g. as a reciprocating unit, up and down relative to a housing or frame of the apparatus so as to sealingly engage—in a lower position of the dome member—the peripheral gas seal with the cartridge around a location where the sealing film is or will be opened to allow entry of pressurized gas into the reservoir.

The cartridge according to the first aspect of the invention is in particular suited for the preparation of a beverage, wherein the liquid ingredient flavors and/or colors a stream of water, e.g. carbonated water, e.g. which water flows through a channel in a column of the cartridge.

In an embodiment, and also according to a further aspect of the invention, the invention relates to a disposable cartridge comprising:
- a molded plastic cartridge body with a bottom and a top, the body delimiting a reservoir that is filled with a single serve portion of a liquid ingredient,
- wherein the top has an aperture in communication with said reservoir, which aperture is hermetically sealed by a top sealing film,
- wherein the cartridge body further comprises a vertically extending bore which extends to an aperture in the bottom of the cartridge body,
- wherein a tubular valve member is movable, e.g. slidable, arranged in the bore, through which valve member a channel extends from an inlet at a top end of the valve member to an outlet at a bottom end of the valve member,
- wherein cartridge body is provided with one or more first dispensing passages between the reservoir and the bore,
- wherein the tubular valve member is provided with one or more second dispensing passages,
- wherein—in a sealing position of the valve member relative to the bore—the one or more second dispensing passages in the tubular valve member are out of register with the one or more first dispensing passages, such that the reservoir is closed,
- and wherein—in a dispensing position of the valve member relative to the bore—the one or more second dispensing passages in the valve member register with the one or more first dispensing passages, such that the reservoir is opened,
- wherein the valve member is movable by a force exerted thereon by said base liquid feed lance in order to move from said sealed position to said dispensing position, thereby allowing dispensing of said liquid ingredient from the reservoir,
- and wherein a base liquid feed lance is connectable to the inlet of the channel in the valve member, so that the base liquid can be fed into the channel and exit the cartridge via one of the outlet of the valve member and the aperture in the bottom of the cartridge,
- wherein, preferably, said one or more second dispensing passages are arranged such that the dispensed liquid ingredient is combined with the base liquid within the channel or at or near the outlet of the channel.

In an embodiment the valve member has an exterior side and an interior side that delimits the channel, and wherein the one or more second dispensing passages are embodied as one or more dispensing grooves in the exterior side of the valve member, said one or more dispensing grooves having a groove outlet from which the liquid ingredient is dispensed. In an embodiment between three and six groove outlets are disposed around a lower end portion of the valve member.

In an alternative of the above embodiment the valve member has an exterior side and an interior side that delimits the channel, wherein the one or more dispensing passages are embodied to extend between said exteriors side and interior side of the valve member.

In an embodiment the outlet of the valve member forms the dispensing outlet for the base liquid or, in another embodiment, the combined base liquid and liquid ingredient.

The present invention also proposes a disposable cartridge filled with a single serve portion of a liquid ingredient to be combined with a base liquid for the preparation of a liquid product, e.g. a liquid food product suitable for human consumption, e.g. a beverage concentrate to be combined with water, e.g. carbonated water, for the preparation of a beverage, the disposable cartridge comprising:
- a molded plastic cartridge body with a bottom and a top, the body delimiting a reservoir that is filled with a single serve portion of a liquid ingredient,
- wherein the top has an aperture in communication with said reservoir, which aperture is hermetically sealed by a top sealing film,
- wherein the cartridge body further comprises a column having a portion that projects upwards from the bottom to an upper side of the central column,
- wherein a vertically extending channel extends through the column from an inlet at a top end thereof to an aperture in the bottom of the cartridge body,
- wherein the bottom has a flexible portion adjacent, e.g. around the column, such that the column is movable downwards by a force exerted thereon relative to the top of the body, e.g. an upper edge of a circumferential wall of the body, between a higher initial position and a lower dispensing position,
- wherein a valve member is arranged within the cartridge and outside of the column, which valve member is stationary arranged within the cartridge so as to be movable, e.g. slidable, relative to the column when the column is moved from its higher initial position to its lower dispensing position,
- wherein cartridge body is provided with one or more dispensing passages arranged to dispense the liquid ingredient from the reservoir,
- wherein—in the higher initial position of the column—the valve member closes the one or more dispensing passages, such that the reservoir is closed,
- and wherein—in the lower dispensing position of the column—the valve member has moved away from the one or more dispensing passages, such that the reservoir is opened,
- and wherein a base liquid feed lance is connectable to the inlet of the channel in the column, so that the base liquid can be fed into the channel and exit the cartridge via the aperture in the bottom of the cartridge,
- wherein, preferably, said one or more dispensing passages are arranged such that the dispensed liquid ingredient is combined with the base liquid within the channel or at or near the outlet of the channel.

In an embodiment the top sealing film is pierceable so as to allow for introduction of pressurized gas into the reservoir in order to pressurize the liquid ingredient therein so as to assist dispensing thereof via the dispensing passages, e.g. when the valve member is in the dispensing position thereof or when the column has been moved down to its dispensing position so that the valve member is away from the one or more dispensing passages.

In an embodiment the bore and the valve member, or the column, are/is arranged underneath the top sealing film with a portion of the top sealing film covering and sealing the inlet of the valve member or of the column, wherein the base liquid feed lance is pierceable through said portion of the top sealing film.

In an embodiment the cartridge body comprises one or more piercing members arranged underneath the top sealing film, so that pressing the top sealing film downwards, e.g. by the base liquid feed lance, causes said one or more piercing members to engage the top sealing film and the locally rupture the top sealing film thereby providing one or more holes that allow for introduction of pressurized gas into the reservoir in order to pressurize the liquid ingredient therein so as to assist dispensing thereof via the dispensing passages when the valve member is in the dispensing position thereof relative to the one or more dispensing passages, for example wherein the one or more piercing members are embodied as one or more integrally molded spike formations.

In an embodiment, preferably for use with gas pressurized assisted dispensing of liquid ingredient from the reservoir, one or more discharge grooves on the exterior side of the valve member each have a collector groove portion, which in the dispensing position of the valve member, acts as receptacle for liquid ingredient, e.g. said liquid ingredient being jetted from an associated first dispensing passage under the influence of the pressurization of said liquid ingredient by pressurized gas, and wherein a further portion of said groove adjoins said collecting portion so as to allow said liquid ingredient to overflow said collector portion and then flow downwards towards an outlet of said groove.

In an embodiment the channel in the valve member has an upper portion with a first diameter and an adjoining lower portion extending up to said outlet, said lower portion and outlet having a second diameter, wherein the first diameter is greater than said second diameter. In a further embodiment the base liquid feed lance has an insertion portion adapted to be inserted into said upper portion of the channel, wherein said feed lance has an internal feed channel therein having a feed channel diameter substantially equal to said second diameter, e.g. between 0.9 and 1.1 times the second diameter, thereby avoiding undue constriction and/or expansion of the flow of base liquid when passing from the feed lance into the second portion of the channel.

In an embodiment the bore has an upper portion with a first diameter and an adjoining lower portion with a second diameter smaller than said first diameter, and wherein the exterior of the valve member has an upper portion with a diameter so as slidably fit in said upper portion of the bore and a lower portion so as to slidably fit in said lower portion of the bore. Possibly the bore has a shoulder, e.g. between said upper and lower portion of the bore, wherein the valve member has on the exterior side thereof an abutment surface adapted to rest against said shoulder in the dispensing position of the valve member.

In an embodiment the valve member and the bore—at least in the sealed position of the valve member—form one or more seals between them, e.g. in an embodiment a seal between them that shields the one or more dispensing passages from the atmosphere.

In an embodiment the cartridge body is a rigid body with the bottom maintaining its shape when the valve member is moved between its sealing position and dispensing position, e.g. moved vertically downward between said positions.

In an embodiment the cartridge body comprises a column, e.g. a column that is integrally molded with a portion of the bottom, e.g. a central portion of the bottom, which column projects upwards from the bottom to an upper end of the central column, through which column the bore extends from the upper end of the column and ends in said aperture in the bottom. In an embodiment the column comprises a separate molded top portion that is secured, e.g. snap-fitted, welded (e.g. by laser), glued, screwed, onto a lower portion of the column.

In an embodiment the cartridge body is an injection molded monolithic plastic body.

In an embodiment the cartridge has a bottom sealing film, which is placed along the underside of the bottom to hermetically seal the aperture and/or the outlet of the valve member. In a preferred version thereof the valve member is movable vertically downward from said sealed position to said dispensing position, and wherein the bottom sealing film is pierceable and is placed so as to be engaged and pierced by the valve member when the valve member is moved down to the dispensing position thereof, said piercing of the bottom sealing film causing opening of said outlet of the channel of the valve member and/or of the aperture.

In an embodiment the top end of the valve member rests against or is sealed to the top sealing film when the valve member is in the sealing position.

In an embodiment the cartridge body forms a supporting surface of the cartridge, which supporting surface lies at a distance below the bottom, e.g. below—when present—a bottom sealing film, so that the bottom or bottom sealing film lies higher than any bearing surface when the cartridge is placed on it.

In an embodiment the cartridge body has a circumferential wall having an upper rim bounding an opening, wherein a top sealing film is fixed to said upper rim, e.g. embodied as an outwardly projecting flange, e.g. said radially projecting flange being embodied to support the cartridge on a bearing surface of a dispensing device.

In an embodiment the valve member is provided with one or more snap portions adapted to form a snap fit as the valve member is moved into the dispensing position thereof.

In an embodiment the outlet or dispensing aperture of the channel has a diameter between 6 and 15 millimeter, e.g. about 8 or 10 millimeter. For non-round channels or apertures, the aperture may have a cross-sectional area greater than 30 mm2, preferably greater than 40 mm2 or even greater than 50 mm2. The aperture may also be less than 200 mm2 in cross section.

In an embodiment a lower portion of the vertically movable column provides a series of outlet openings of the one or more dispensing passages that are arranged in a circular arrangement around the outlet or aperture from which the base liquid, e.g. carbonated water, emerges.

In an embodiment the one or more outlet openings of the one or more dispensing passages are arranged to dispense the liquid ingredient basically as an annular shroud around the jet of base liquid. The jetted base liquid and liquid ingredient adjoin one another rather immediately after they emerge from the cartridge and in the further duration of travel they intermix, possibly with a final mixing occurring as the mixture swirls into the glass or other beverage drinking container. It is noted that said mixing is in particular seen when carbonated water is used as base liquid and then this manner of combining the liquid ingredient with the carbonated water is greatly beneficial for keeping the carbondioxide in the base liquid. In contrast, an effective jetting of one or more streams of liquid ingredient into the stream of carbonated water is observed to agitate the carbonated water in undue manner and thereby cause much of the carbondioxide to escape so that the final beverage contains limited carbondioxide.

In an embodiment with a column and a valve member the cartridge may have multiple, e.g. between two and four, dispensing passages, and multiple dispensing passages inlets that are initially closed by the valve member, e.g. one inlet per dispensing passage.

In an embodiment a dispensing passage inlet in the column, e.g. in the foot thereof, that is initially closed by the valve member is oriented at an angle relative to the dispensing passage such that a jet of liquid ingredient emerging from an opened inlet, e.g. due to pressurization of the liquid ingredient as discussed herein, collides against a wall portion of the passage thereby reducing, preferably annihilating, the speed of said jet.

In an embodiment the total of the one or more outlet openings of the one or more dispensing passages is multiple times larger in cross section than the corresponding inlet or inlets, e.g. at least 10 times larger.

A dispensing passage inlet may have a circular form, e.g. having a diameter between 0.5 and 1.5 mm, but may also have a slot shape, e.g. as a circumferentially arranged slot inlet in the foot region of the column.

The sealing surfaces of the valve member and of the column may be conical, but may also be cylindrical.

In an embodiment the cartridge body has a circumferential wall around the perimeter of the bottom and wherein the bore is concentric relative to an axis of the circumferential wall of the cartridge.

The invention also relates to a disposable cartridge filled with a single serve portion of a liquid ingredient to be combined with a base liquid for the preparation of a liquid product, e.g. a liquid food product suitable for human consumption, e.g. a beverage concentrate to be combined with water, e.g. carbonated water, for the preparation of a beverage, the disposable cartridge comprising:

a molded plastic cartridge body with a bottom and a top, the body delimiting a reservoir that is filled with a single serve portion of a liquid ingredient, wherein the top has an aperture in communication with said reservoir, which aperture is hermetically sealed by a top sealing film, wherein the cartridge body further comprises a column having a portion that projects upwards from the bottom to an upper side of the column, wherein a channel extends through the column from an inlet at a top end thereof to an aperture at the bottom side of the cartridge body, wherein the bottom has a flexible portion adjacent, e.g. around the column, such that the column is movable downwards by a force exerted thereon relative to the top of the body, e.g. an upper edge of a circumferential wall of the body, between a higher initial position and a lower dispensing position, and wherein a base liquid feed lance is connectable to the inlet of the channel in the column, so that the base liquid can be fed into the channel and exit the cartridge via the aperture in the bottom of the cartridge, wherein cartridge body is provided with one or more dispensing passages arranged to dispense the liquid ingredient from the reservoir, which one or more dispensing passages have one or more dispensing passage outlets arranged so that liquid ingredient emerging therefrom adjoins a base liquid stream emerging from the aperture at the bottom side of the channel, and wherein the cartridge has a bottom sealing film, which is placed along the side of the bottom and hermetically seals at least one or more outlets of the one or more dispensing passages, said bottom sealing film being secured to the cartridge at one or more locations remote from the one or more outlets, wherein the bottom sealing film is adapted to rupture and/or to tear away from the outlets due to the column being moved downwards to its lower dispensing position, thereby opening the dispensing channel outlets.

This version does not require the presence of a valve member as discussed herein, but could, if desired e.g. be combined with such a valve member, e.g. in view of guarantee that the dispensing passage outlet was sealed prior to use of the cartridge. In absence of any valve member, which is a preferred version if a bottom sealing film is employed, the bottom sealing film is the only obstruction that prevents the liquid ingredient from flowing out of the reservoir.

In a preferred embodiment the bottom sealing film has a hole that is aligned with and has a diameter that substantially corresponds to the aperture or outlet from which the base liquid stream emerges from the cartridge. This design, e.g. like a disc with a central hole therein as shape of the bottom sealing film, avoids that after rupture of the bottom sealing film, any flaps of the ruptured film interfere with the flow of base liquid. As will be appreciated such interference would be detrimental for the carbondioxide retention in the emitted base liquid stream.

For example the bottom of the cartridge has an annular flexing portion around the foot of the column and a further non-flexing portion surrounding the flexing portion, with the bottom sealing film being secured to, e.g. by heat-seal, to the non-flexing portion. In combination with a suitable vertical stroke of the column, the bottom sealing film will rupture and and/or tear away from the outlets of the dispensing passages.

Preferably the bottom sealing film is lightly secured across the outlets of the dispensing passages.

The invention also relates to a disposable cartridge filled with a single serve portion of a liquid ingredient to be combined with a base liquid for the preparation of a liquid product, e.g. a liquid food product suitable for human consumption, e.g. water, e.g. carbonated water, for the preparation of a beverage, the disposable cartridge comprising:

an injection molded monolithic plastic body with a bottom having an underside and with a circumferential wall, an upper edge of the circumferential wall bounding a filling aperture, wherein the filling aperture of the cartridge is hermetically sealed by a top sealing film, a circumference of the top sealing film being fixed on the upper edge, wherein the bottom has an aperture, the monolithic plastic body further comprising a column integrally molded with a portion of the bottom, e.g. a central portion, the column projecting upwards from the bottom to an upper end of the column, through which column a bore extends from the upper end of the column and ending in said aperture in the bottom, wherein the plastic body bounds a reservoir filled with said liquid ingredient between said column and the circumferential wall, wherein a tubular valve member is slidably arranged in the column, through which valve member a channel extends from an inlet at a top end of the valve member to an outlet at a bottom end of the valve member, wherein the column is provided with one or more first dispensing passages between an exterior of the central column and the bore, wherein the tubular valve member is provided with one or more second dispensing passages, wherein—in a raised sealing position of the valve member relative to the column—the one or more second dispensing passages in the valve member are out of register with the one or more first dispensing passages in the column, such that the reservoir is closed, and wherein—in a lower dispensing position of the valve member relative to the column—the one or more second dispensing passages in the valve member register with the one or more first dispensing passages in the column, such that the reservoir is opened, wherein the top sealing film is pierceable, so that a base liquid feed lance can be pierced through the top sealing film and connected to the inlet of the channel in the valve member, so that the base liquid can be fed into the channel, wherein the valve member is movable downwards by a force exerted thereon by said base liquid feed lance in order to move from said sealed position to said lower dispensing position, thereby opening said reservoir and allowing dispensing of said liquid ingredient from the reservoir via said first and second dispensing channels, wherein, preferably, said one or more second dispensing passages are arranged such that the dispensed liquid ingredient is combined with the base liquid within the channel or at or near the outlet of the channel.

The present invention also relates to a disposable cartridge filled with a single serve portion of a liquid ingredient to be combined with a base liquid for the preparation of a liquid product, e.g. a liquid food product suitable for human consumption, e.g. a beverage concentrate to be combined with water, e.g. carbonated water, for the preparation of a beverage, the disposable cartridge comprising:

a cartridge body with a bottom and a top, the body delimiting a reservoir that is filled with a single serve portion of a liquid ingredient, wherein the top has an aperture in communication with said reservoir, which aperture is hermetically sealed by a top sealing film, wherein the cartridge body further comprises a column having a portion that projects upwards from the bottom to an upper side of the column, wherein a channel extends through the column from an inlet at a top end thereof to an aperture at the bottom side of the cartridge body, wherein the bottom has a flexible portion adjacent, e.g. around the column, such that the column is movable downwards by a force exerted thereon relative to the top of the body, e.g. an upper edge of a circumferential wall of the body, between a higher initial position and a lower dispensing position, and wherein a base liquid feed lance is connectable to the inlet of the channel in the column, so that the base liquid can be fed into the channel and exit the cartridge via the aperture in the bottom of the cartridge, wherein the cartridge body is provided with one or more dispensing passages arranged to dispense the liquid ingredient from the reservoir, which one or more dispensing passages have one or more dispensing passage outlets arranged so that liquid ingredient emerging therefrom adjoins a base liquid stream emerging from the aperture at the bottom side of the channel, and wherein the cartridge has a bottom sealing film, which is placed along the side of the bottom and hermetically seals at least one or more outlets of the one or more dispensing passages, said bottom sealing film being secured to the cartridge at one or more locations remote from the one or more outlets, wherein the bottom sealing film is provided with a hole aligned with the aperture from which the base liquid emerges, which bottom sealing film is adapted to rupture and/or to tear away from the outlets due to the column being moved downwards to its lower dispensing position, thereby opening the dispensing channel outlets.

The present invention also relates to a disposable cartridge filled with a single serve portion of a liquid ingredient to be combined with a base liquid for the preparation of a liquid product, e.g. a liquid food product suitable for human consumption, e.g. a beverage concentrate to be combined with water, e.g. carbonated water, for the preparation of a beverage, the disposable cartridge comprising:

a cartridge body with a bottom and a top, the body delimiting a reservoir that is filled with a single serve portion of a liquid ingredient, wherein the top has an aperture in communication with said reservoir, which aperture is hermetically sealed by a top sealing film, wherein the cartridge body further comprises a column having a portion that projects upwards from the bottom to an upper side of the column, wherein a channel extends through the column from an inlet at a top end thereof to an aperture at the bottom side of the cartridge body, wherein the bottom has a flexible portion adjacent, e.g. around the column, such that the column is movable downwards by a force exerted thereon relative to the top of the body, e.g. an upper edge of a circumferential wall of the body, between a higher initial position and a lower dispensing position, and wherein a base liquid feed lance is connectable to the inlet of the channel in the column, so that the base liquid can be fed into the channel and exit the cartridge via the aperture in the bottom of the cartridge, wherein the top sealing film has a hole aligned with the inlet of the channel allowing the base liquid feed lance to connect to the inlet of the channel by passing through said hole without piercing said top sealing film.

The present invention also relates to a disposable cartridge filled with a single serve portion of a liquid ingredient to be combined with a base liquid for the preparation of a liquid product, e.g. a liquid food product suitable for human consumption, e.g. a beverage concentrate to be combined with water, e.g. carbonated water, for the preparation of a beverage, the disposable cartridge comprising:

a cartridge body with a bottom and a top, the body delimiting a reservoir that is filled with a single serve portion of a liquid ingredient, wherein the top has an aperture in communication with said reservoir, which aperture is hermetically sealed by a top sealing film, wherein the cartridge body further comprises a column having a portion that projects upwards from the bottom to an upper side of the column, wherein a channel extends through the column from an inlet at a top end thereof to an aperture at the bottom side of the cartridge body, wherein a base liquid feed lance is connectable to the inlet of the channel in the column, so that the base liquid can be fed into the channel and exit the cartridge via the aperture in the bottom of the cartridge, wherein the cartridge body is provided with one or more dispensing passages arranged to dispense the liquid ingredient from the reservoir, wherein: a) the one or more dispensing passages have one or more dispensing passage outlets arranged so that liquid ingredient emerging therefrom adjoins a base liquid stream emerging from the aperture at the bottom side of the channel, or b) the one or more dispensing passage have one or more dispensing passage outlets arranged within the channel so that the ingredient emerging therefrom mixes with a base liquid stream prior to the mixture emerging from the aperture at the bottom side of the channel, and wherein the cartridge body comprises one or more piercing members arranged underneath the top sealing film, so that pressing the top sealing film downwards, e.g. by the base liquid feed lance, causes said one or more piercing members to engage the top sealing film and the locally rupture the top sealing film thereby providing one or more holes that allow for introduction of pressurized gas into the reservoir in order to pressurize the liquid ingredient therein so as to assist dispensing thereof via the dispensing passages, for example wherein the one or more piercing members are embodied as one or more integrally molded spike formations.

It will be appreciated by the skilled person that a technical feature discussed herein as required or as optional with respect to one embodiment of the invention may be equally applicable to one or more other embodiments described herein, with the feature performing its designated function. Such combinations are all envisaged herein unless a combination would result in a technical impossible solution and/or not meet the desired functionality.

The present invention also relates to a system for the preparation of a liquid product, e.g. a liquid food product, e.g. a beverage, which system comprises:

a) a disposable cartridge as disclosed herein, b) a dispensing apparatus, e.g. a beverage dispensing apparatus, the apparatus being at least provided with:

a holder for accommodating and retaining the cartridge at a dispensing location in the device, a base liquid feed assembly with a base liquid feed lance disposed at the dispensing location, which lance is embodied to connect to the channel of the valve member or of the column of the cartridge, e.g. whilst piercing through the top sealing film of the cartridge, so that base liquid can be fed into the channel, wherein the dispensing apparatus has an operable displacement device which is adapted to produce a movement of the holder for the cartridge and the base liquid feed lance relative to each other, so that when the displacement device is operated the lance connects to the channel.

For example—when a valve member is present in the cartridge—the base liquid feed lance causes a relative motion that moves the valve member into a dispensing or opened position thereof, e.g. pressing the valve member downwards from the raised sealing position to the lower dispensing position thereof or moving the column down relative to a stationary valve member, or causes a bottom sealing film of the cartridge—when present—to rupture and/or tear away from one or more dispensing passage outlets initially sealed by said bottom sealing film, and thereby allowing the dispensing from the cartridge.

In an embodiment the liquid feed assembly is equipped for feeding in water as the base liquid, e.g. carbonated water, e.g. selectively carbonated and non-carbonated water.

In an embodiment the liquid feed assembly comprise a pump for the base liquid. In another embodiment the liquid feed assembly comprises a water mains connector allowing to connect the device to a water mains, e.g. with the assembly further comprising a water pressure regulator, e.g. causing a pressure reduction to a pre-set water pressure to avoid effects of water mains pressure variations.

In an embodiment the liquid feed lance is stationary mounted in the device, and the displacement device is equipped to move the holder towards the lance and away from it, in such a way that in the process the lance connects to the channel of the valve member or of the column.

In an embodiment the lance is disposed so as to be movable and is movable by means of a corresponding displacement device of the apparatus.

In an embodiment the holder for the cartridge is equipped to accommodate and retain the cartridge in a substantially horizontal position with the bottom downwards, the holder having an aperture below the bottom of the cartridge in such a way that during dispensing of the liquid product said product remains clear of the holder.

In an embodiment at a distance below the dispensing location of the holder the device has a standing place for a mug or other receptacle, e.g. a drinking glass.

In an embodiment the apparatus is provided with a pressurized gas source, preferably a pressurized air source, e.g. an air pump, wherein the apparatus is adapted to bring said pressurized gas source in direct communication with the reservoir of the disposable cartridge so as to allow said liquid ingredient therein to be pressurized by said gas thereby assisting the dispensing thereof from the reservoir when said valve member has been brought into said dispensing position thereof.

In an embodiment the apparatus comprises a pressurization dome member having along a periphery thereof an outer gas seal that is adapted to sealingly engage the disposable cartridge around a location where the top sealing film is pierced to allow entry of pressurized gas into the reservoir, e.g. the outer gas seal being embodied to seal onto an upper end of a circumferential wall of the disposable cartridge, and wherein the pressurized gas source is connected so as to allow feeding of pressurized gas beneath said dome member gen the outer gas seal thereof sealingly engages the disposable cartridge and the top sealing film has been pierced.

In an embodiment the base liquid feed lance protrudes from said dome member.

In another embodiment the apparatus comprises a puncture member adapted to puncture the top sealing film in an area between the central column and the circumferential wall, and the apparatus is adapted to feed pressurized gas, e.g., air, into said reservoir via said puncture area.

The apparatus may be provided with a control device for the pressurized gas source, e.g. adapted to provide adjustable timing of the pressurization of the liquid ingredient, e.g. relative to the process of opening the dispensing passages, e.g. with a timed delay relative to the effective opening. The control device, e.g. a computerized control device for the pressurized gas source may also be linked to a cartridge identification assembly that is adapted to identify the cartridge, e.g. with respect to the liquid ingredient therein, In an embodiment the diameter of the feed channel in the base liquid feed lance is between 5 and 10 mm, e.g. between 6 and 9 mm, e.g. about 8 mm.

In an embodiment the apparatus comprises a carbonator.

In an embodiment the apparatus comprises a cooling device adapted to cool said base liquid, e.g. to a temperature between 2 and 15° C.

In an embodiment the apparatus is integrated in a domestic refrigerator, e.g. in a door thereof.

In another embodiment the valve member has a venturi portion, wherein the valve member has one or more dispensing passages that are connected to the venturi portion, in such a way that when base liquid is fed through the channel, a venturi effect occurs and the liquid ingredient goes through the one or more aligned dispensing passages into the venturi portion and mixes there with the base liquid, which mixture is dispensed via the outlet of the channel.

The present invention also relates to a system for the preparation of a liquid product, e.g. a liquid food product, e.g. a beverage, which system comprises:

a) a disposable cartridge filled with a single serve portion of a liquid ingredient to be combined with a base liquid for the preparation of a liquid product, e.g. a beverage concentrate to be combined with water, e.g. carbonated water, for the preparation of a beverage, the disposable cartridge comprising:

a cartridge body delimiting a reservoir that is filled with a single serve portion of a liquid ingredient, wherein the cartridge body has an aperture in communication with said reservoir, which aperture is hermetically sealed by a sealing film, e.g. a top sealing film, wherein cartridge body is provided with one or more dispensing passages arranged to dispense the liquid ingredient from the reservoir, b) a dispensing apparatus, e.g. a beverage dispensing apparatus, the apparatus comprising:

a holder adapted to accommodate and retain the cartridge at a dispensing location in the apparatus, a pressurized gas source, preferably a pressurized air source, e.g. an air pump, wherein the apparatus is adapted to bring said pressurized gas source in direct communication with the reservoir of the disposable cartridge so as to allow said liquid ingredient therein to be pressurized by said gas thereby assisting the dispensing thereof from the reservoir via said one or more dispensing passages, wherein the cartridge is provided with one or more piercing members that are arranged on the inside of the sealing film to be opened for the introduction of pressurized gas, e.g. air, into the liquid ingredient reservoir, so that pressing the sealing film inward, e.g. downward, causes said one or more piercing members to engage the top sealing film and locally rupture the sealing film thereby providing one or more openings that allow said introduction of pressurized gas into the reservoir in order to assist dispensing of said liquid ingredient. It will be appreciated that the cartridge and/or the apparatus can have one or more of the features as discussed herein with reference to the first aspect of the invention.

The invention also relates to a system for the preparation of a liquid product, e.g. a liquid food product, e.g. a beverage, which system comprises:

a) a disposable cartridge filled with a single serve portion of a liquid ingredient to be combined with a base liquid for the preparation of a liquid product, e.g. a beverage concentrate to be combined with water, e.g. carbonated water, for the preparation of a beverage, the disposable cartridge comprising:

a cartridge body delimiting a reservoir that is filled with a single serve portion of a liquid ingredient, wherein the cartridge body has an aperture in communication with said reservoir, which aperture is hermetically sealed by a sealing film, e.g. a top sealing film, wherein cartridge body is provided with one or more dispensing passages arranged to dispense the liquid ingredient from the reservoir, b) a dispensing apparatus, e.g. a beverage dispensing apparatus, the apparatus comprising:

a holder adapted to accommodate and retain the cartridge at a dispensing location in the apparatus, a pressurized gas source, preferably a pressurized air source, e.g. an air pump, wherein the apparatus is adapted to bring said pressurized gas source in direct communication with the reservoir of the disposable cartridge so as to allow said liquid ingredient therein to be pressurized by said gas thereby assisting the dispensing thereof from the reservoir via said one or more dispensing passages, wherein the cartridge body has a channel that extends from an inlet of the channel to a dispensing aperture, wherein a base liquid feed member of the dispensing apparatus is adapted to connect to said inlet of the channel so that base liquid fed into the channel travels through the channel and exits the channel via the dispensing aperture, wherein the one or more dispensing passages have one or more outlets which are arranged so that liquid ingredient emerges from said one or more dispensing passage outlets as a flow or flows distinct from the stream of base liquid emerging from the dispensing aperture of the channel, wherein the one or more dispensing passage outlets are arranged so that liquid ingredient emerging therefrom adjoins the outside of the base liquid stream that has emerged from the dispensing aperture. It will be appreciated that the cartridge and/or the apparatus can have one or more of the features as discussed herein with reference to the first aspect of the invention.

The invention also relates to a system for the preparation of a liquid product, e.g. a liquid food product, e.g. a beverage, which system comprises:

a) a disposable cartridge filled with a single serve portion of a liquid ingredient to be combined with a base liquid for the preparation of a liquid product, e.g. a beverage concentrate to be combined with water, e.g. carbonated water, for the preparation of a beverage, the disposable cartridge comprising:

a cartridge body delimiting a reservoir that is filled with a single serve portion of a liquid ingredient, wherein cartridge body is provided with one or more dispensing passages arranged to dispense the liquid ingredient from the reservoir, b) a dispensing apparatus, e.g. a beverage dispensing apparatus, the apparatus comprising:

a holder adapted to accommodate and retain the cartridge at a dispensing location in the apparatus, a pressurized gas source, preferably a pressurized air source, e.g. an air pump, wherein the apparatus is adapted to bring said pressurized gas source in direct communication with the reservoir of the disposable cartridge so as to allow said liquid ingredient therein to be pressurized by said gas thereby assisting the dispensing thereof from the reservoir via said one or more dispensing passages, wherein the dispensing apparatus also comprises a gas pressure control assembly that is adapted to control the pressure of said gas pressurization on the basis of at least an inputted temperature of the liquid ingredient and/or of the cartridge, e.g. allowing to compensate for a temperature dependent viscosity effect of the liquid ingredient, e.g. increasing gas pressure when the liquid ingredient is cold. It will be appreciated that the cartridge and/or the apparatus can have one or more of the features as discussed herein with reference to the first aspect of the invention.

In an embodiment the apparatus comprises a temperature sensor adapted to sense the temperature of the liquid ingredient and/or of the cartridge at a start of a dispensing cycle, e.g. when placed in the holder of the apparatus or when arriving at or moving to the dispensing location.

In an embodiment the apparatus is provided with a user input device adapted to allow a user to input said temperature, for example the user input device on the apparatus or on a remote device wirelessly connected thereto being adapted to present user selectable inputs, e.g. including options representing "cartridge taken from a refrigerator" and "ambient temperature cartridge".

In an embodiment the cartridge, e.g. the sealing film thereof, has a temperature responsive area, e.g. with a color responsive to temperature that changes color due to temperature change and thereby provides an indication of the actual temperature of the liquid ingredient and/or of the cartridge, e.g. wherein the apparatus or a remote device wirelessly connected thereto is provided with a reader that detects said temperature responsive area, e.g. variable color area, and communicates corresponding instruction to the gas pressure control assembly.

The skilled person will realize that a temperature dependent indicator for a beverage concentrate cartridge may comprise an independent invention per se.

The present invention also relates to a disposable cartridge filled with a single serve portion of a liquid ingredient to be combined with a base liquid for the preparation of a liquid product, e.g. a beverage concentrate to be combined with water, e.g. carbonated water, for the preparation of a beverage, which cartridge comprises:

a body with a reservoir filled with said liquid ingredient, and with a wall bounding an aperture in communication with said reservoir, e.g. a filling aperture for said liquid ingredient, wherein the aperture of the cartridge is hermetically sealed by a sealing film, wherein the cartridge is provided with one or more piercing members that are arranged underneath the portion of the sealing film, so that pressing the sealing film inward, e.g. downward, e.g. by a base liquid feed lance, causes said one or more piercing members to engage the sealing film and locally rupture the sealing film thereby providing one or more openings that allow for an introduction of pressurized gas into the reservoir in order to assist dispensing of said liquid ingredient.

The present invention also relates to a disposable cartridge filled with a single serve portion of a liquid ingredient to be combined with a base liquid for the preparation of a liquid product, e.g. a beverage concentrate to be combined with water, e.g. carbonated water, for the preparation of a beverage, which cartridge comprises:

a body with a reservoir filled with said liquid ingredient, and with a wall bounding an aperture in communication with said reservoir, e.g. a filling aperture for said liquid ingredient, wherein the aperture of the cartridge is hermetically sealed by a sealing film, wherein the cartridge body comprises a column which is movable inwards, e.g. downwards, from an initial position to a dispensing position, which column is sealed to said sealing film, wherein a channel extends through the column from an inlet of the channel at a top end of the column, allowing to connect a base liquid feed member to said inlet of the channel and to engage the column allowing to feed said base liquid into the channel and to move said column to said dispensing position, wherein a portion of the sealing film covering the reservoir is provided with one or more premade score lines, e.g. by laser machining, which are embodied such that pressing the column inward, e.g. downward, to said dispensing position causes said one or more premade score lines to rupture thereby providing said one or more openings that allow said introduction of pressurized gas into the reservoir in order to assist dispensing of said liquid ingredient.

The present invention also relates to a cartridge for the production of a flavoured carbonated beverage from a stream of carbonated water, the cartridge defining a flow channel for passage of the stream of carbonated water through or along the cartridge and comprising a reservoir for receiving a liquid concentrate, the reservoir comprising at least one dispensing passage through which the concentrate can exit the reservoir and contact the stream and a seal for initially closing the dispensing passage, wherein the dispensing passage comprises a throttle region having a relatively smaller flow cross-section and an outlet region for contact with the stream having a relatively larger flow cross-section, the throttle region being between the outlet region and the reservoir. It will be appreciated that the cartridge and/or the apparatus can have one or more of the features as discussed herein with reference to the first aspect of the invention.

The present invention also relates to a cartridge for the production of a flavoured carbonated beverage from a stream of carbonated water, the cartridge comprising a body shaped as an annulus of U-shaped cross-section defining a reservoir for receiving a liquid concentrate, being located between an outer circumferential wall and a central column, the central column defining a flow channel for passage of the stream of carbonated water without entry into the reservoir, the reservoir having a ring shaped aperture at an open end of the U being closed by a top sealing film, wherein a bottom of the body at a closed end of the U has a flexible portion such that the central column can be displaced downwards with respect to the outer circumferential wall and wherein in use, downward displacement of the central column causes opening of a dispensing passage whereby concentrate can exit the reservoir and contact the stream after or during passage through the flow channel. It will be appreciated that the cartridge and/or the apparatus can have one or more of the features as discussed herein with reference to the first aspect of the invention.

The present invention also relates to a cartridge for the production of a flavoured carbonated beverage from a stream of carbonated water, the cartridge comprising a body shaped as an annulus of U-shaped cross-section defining a reservoir for receiving a liquid concentrate, being located between an outer circumferential wall and a central column, the central column defining a flow channel for passage of the stream of carbonated water without entry into the reservoir, the reservoir having a ring shaped aperture at an open end of the U being closed by a top sealing film and internal rupturing or piercing members within the reservoir and located adjacent to the top sealing film, wherein the central column is configured to be displaceable downwards with respect to the outer circumferential wall, whereby downward displacement of the central column causes the top sealing film to be urged against the internal rupturing members and ruptured. It will be appreciated that the cartridge and/or the apparatus can have one or more of the features as discussed herein with reference to the first aspect of the invention.

The cartridges described above and hereinafter or at least their bodies may alternatively be described as defining an annulus of U-shaped cross-section, with the filling aperture at the open end of the U being closed by the top sealing film. The cartridge bodies may most conveniently be formed of plastic materials e.g. in a one piece or multi-piece injection moulding operation or assembled from injection molded pieces, e.g. by laser welding a top portion piece of the column onto an integrally monolithic moulded cartridge body piece with circumferential wall, flexible bottom, and a further portion of the column. It is however not excluded that parts of the cartridge may be made by thermoforming or by blow moulding from a parison.

The present invention also relates to the combination of a cartridge and base liquid feed lance as disclosed herein.

The present invention also relates to a method for preparation of a liquid product wherein use is made of a cartridge and/or apparatus and/or system as disclosed herein.

The present invention also relates to an apparatus as disclosed herein, e.g. embodied as a dispenser device for carbonated and/or non-carbonated beverages based on single serve cartridges as disclosed herein or otherwise.

Figure 2:
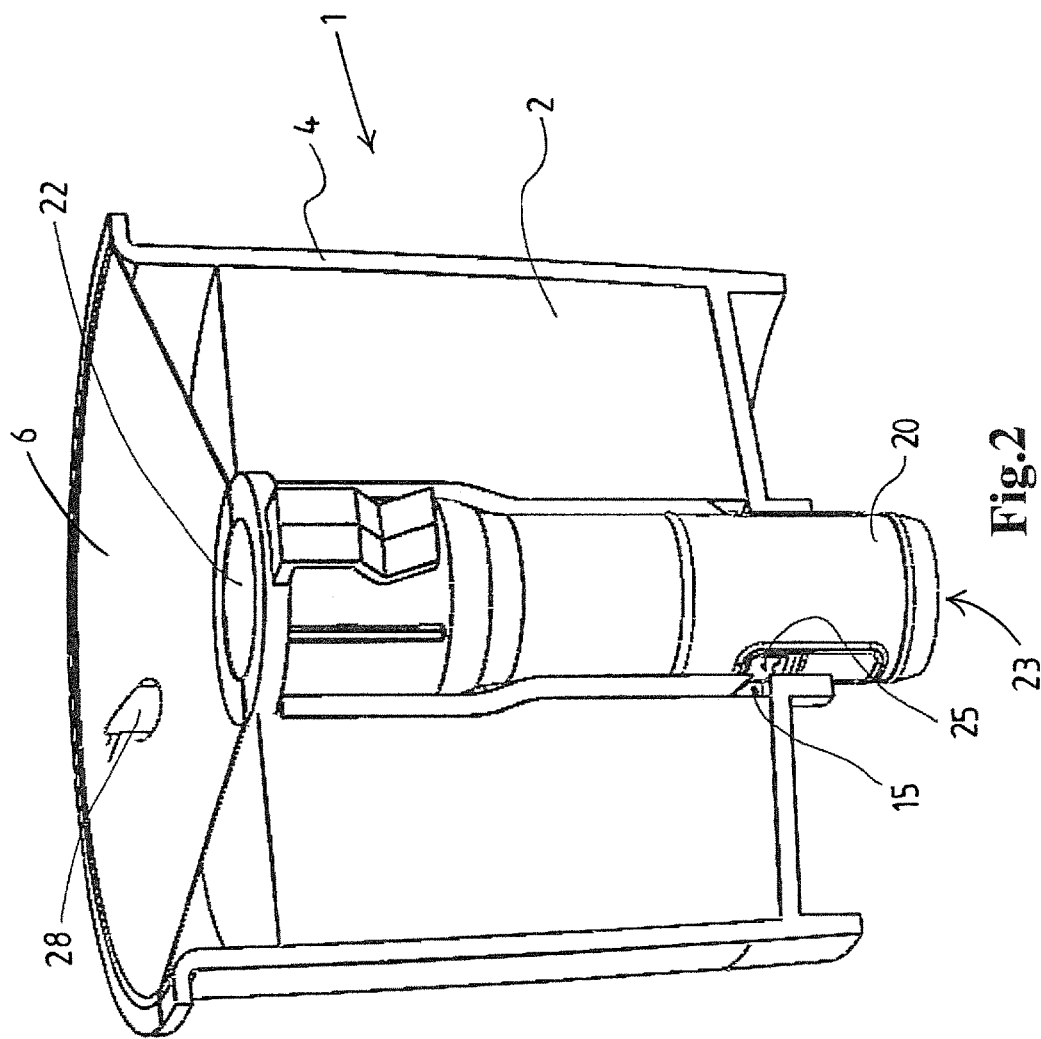
Figure 3:
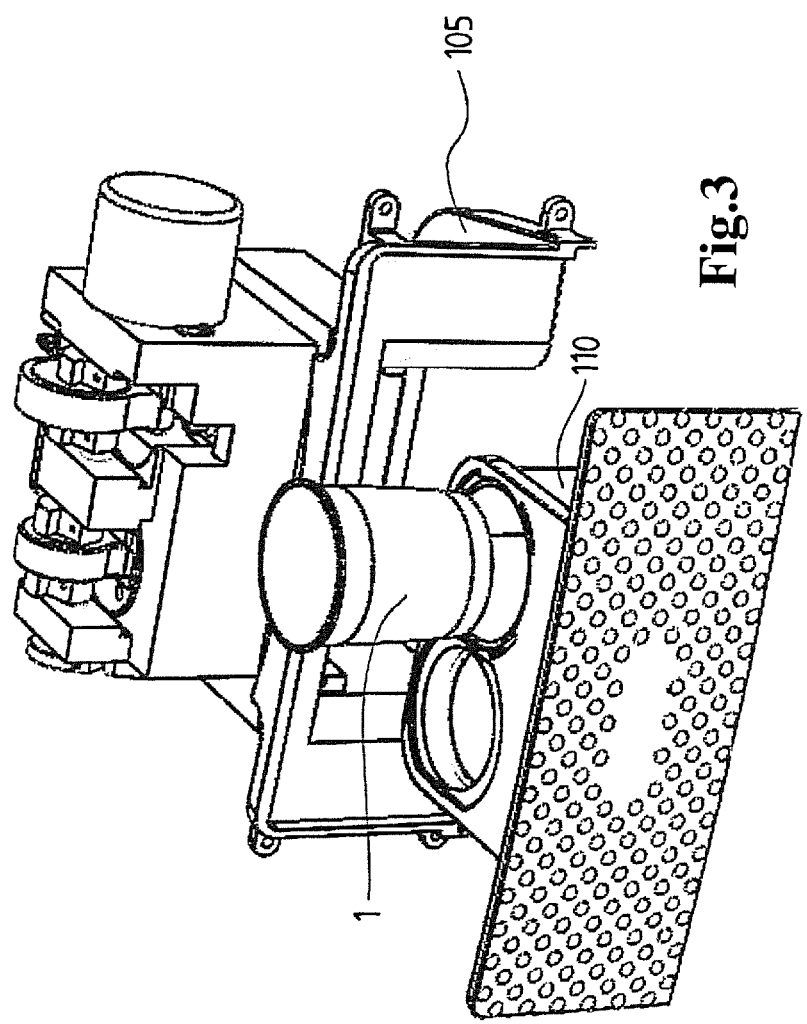
Figure 4:
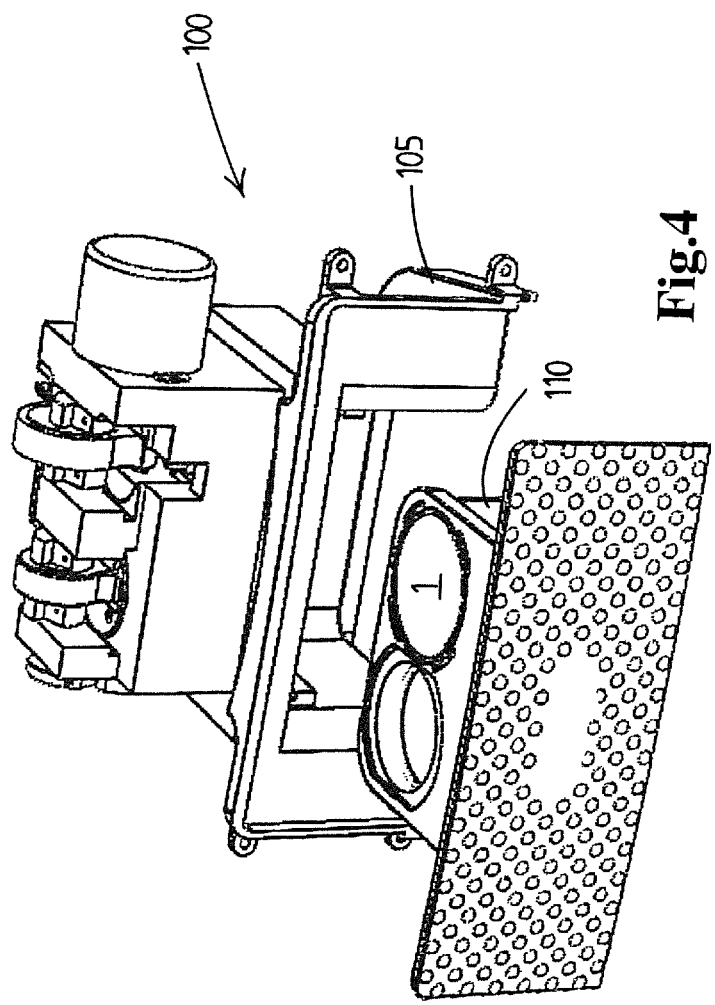
Figure 5:
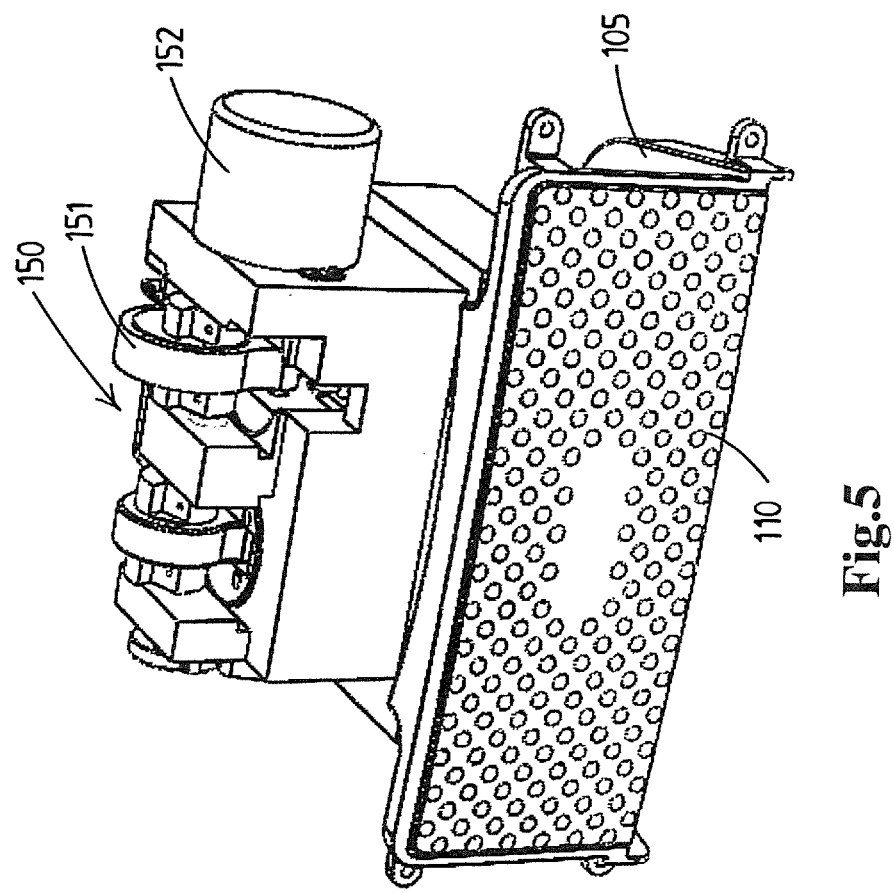
Figure 6:
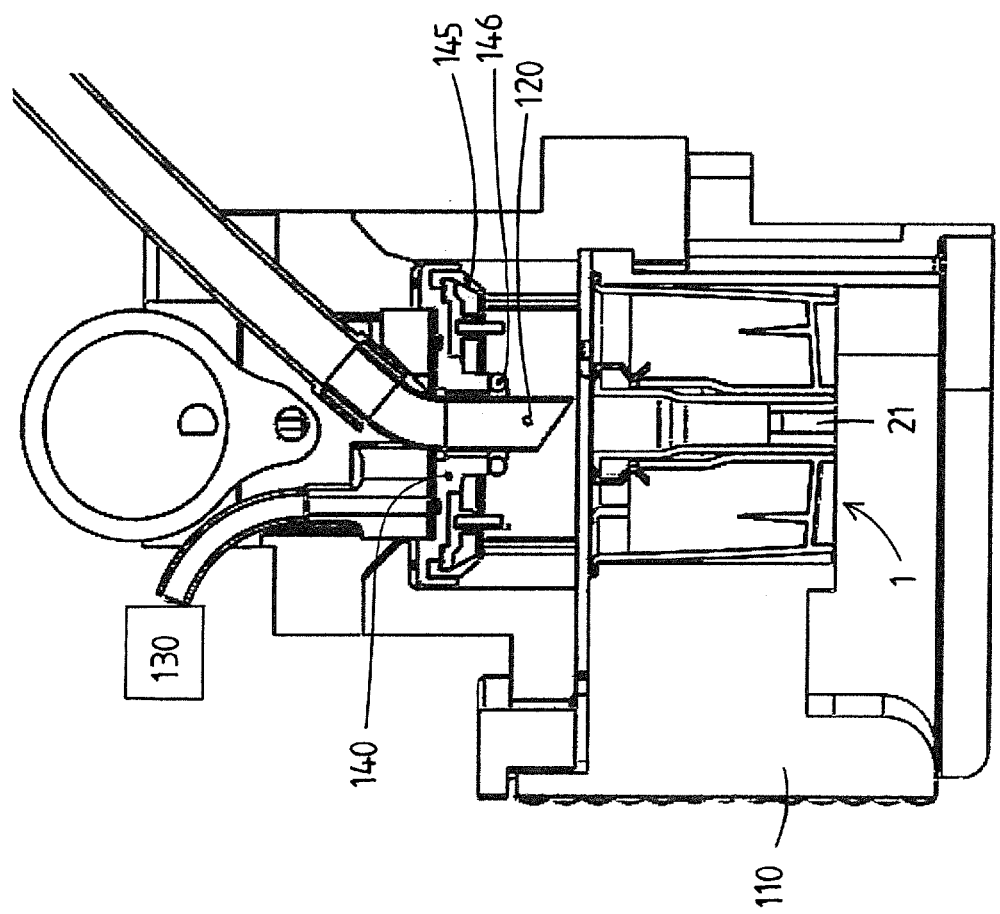
Figure 7:
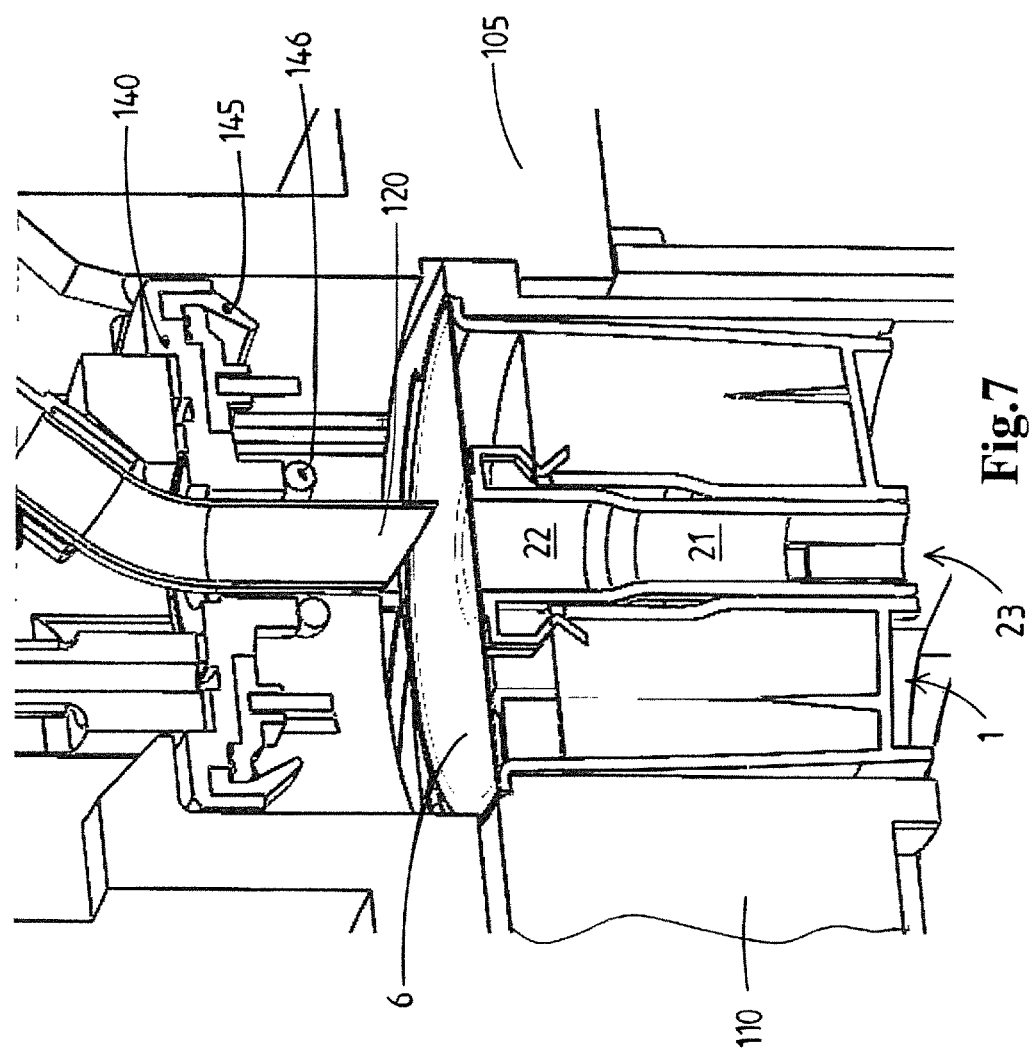
Figure 8:
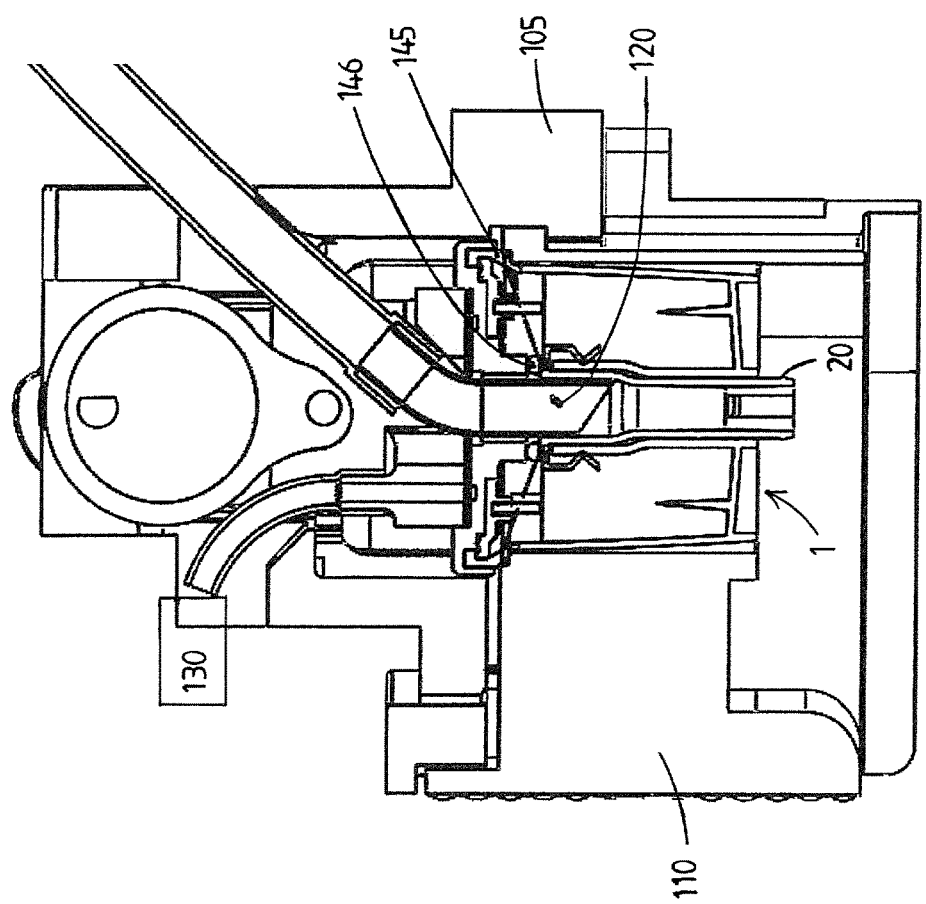
Figure 9:
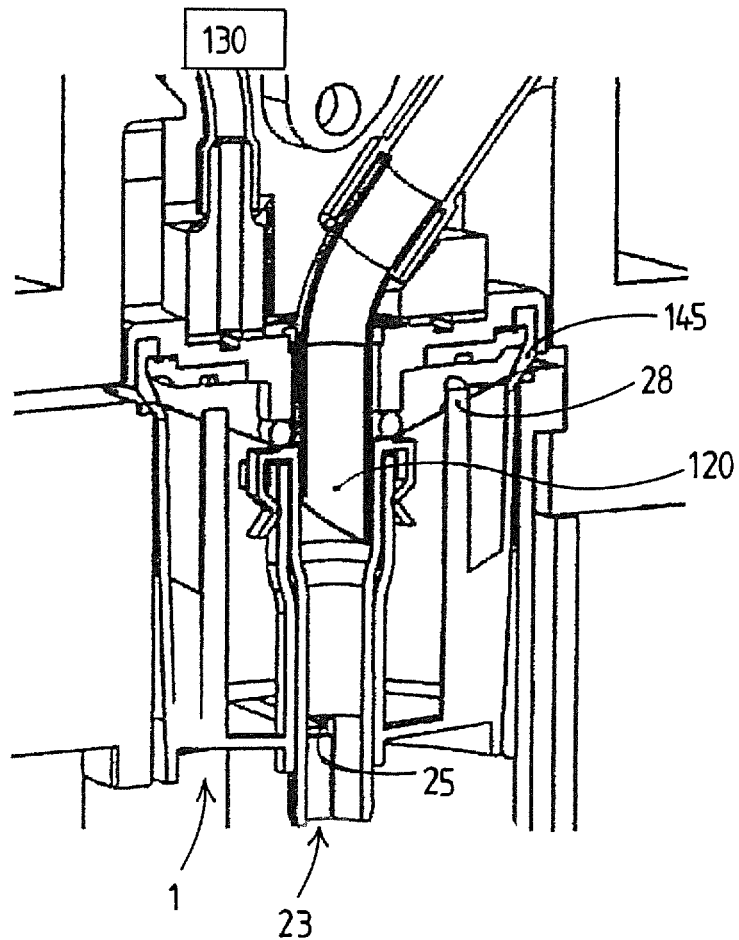
Figure 10:
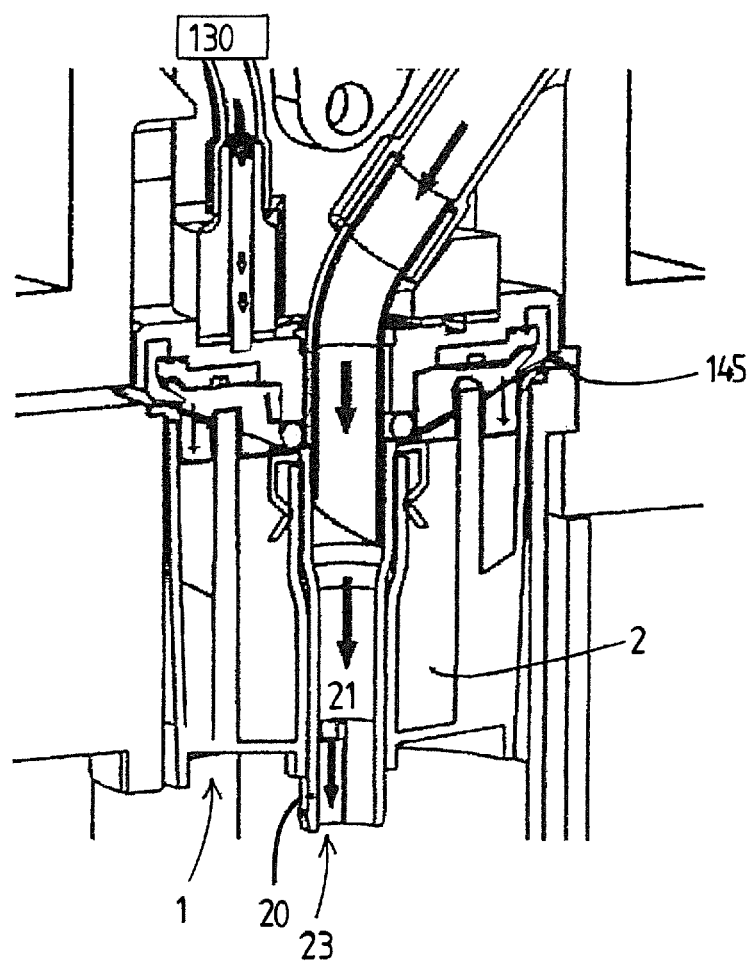
Figure 11:
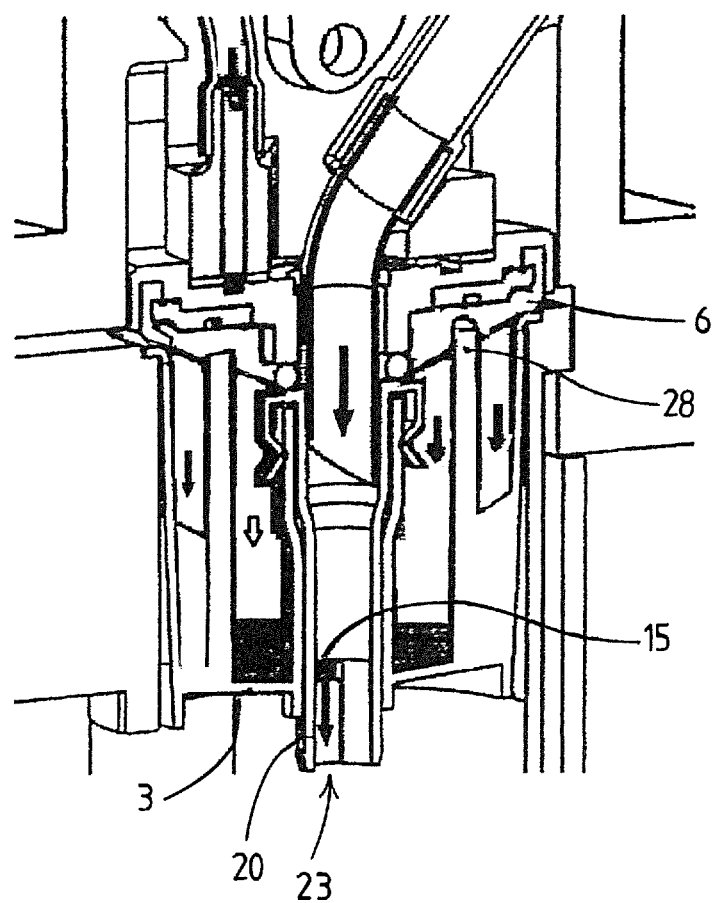
Figure 12:
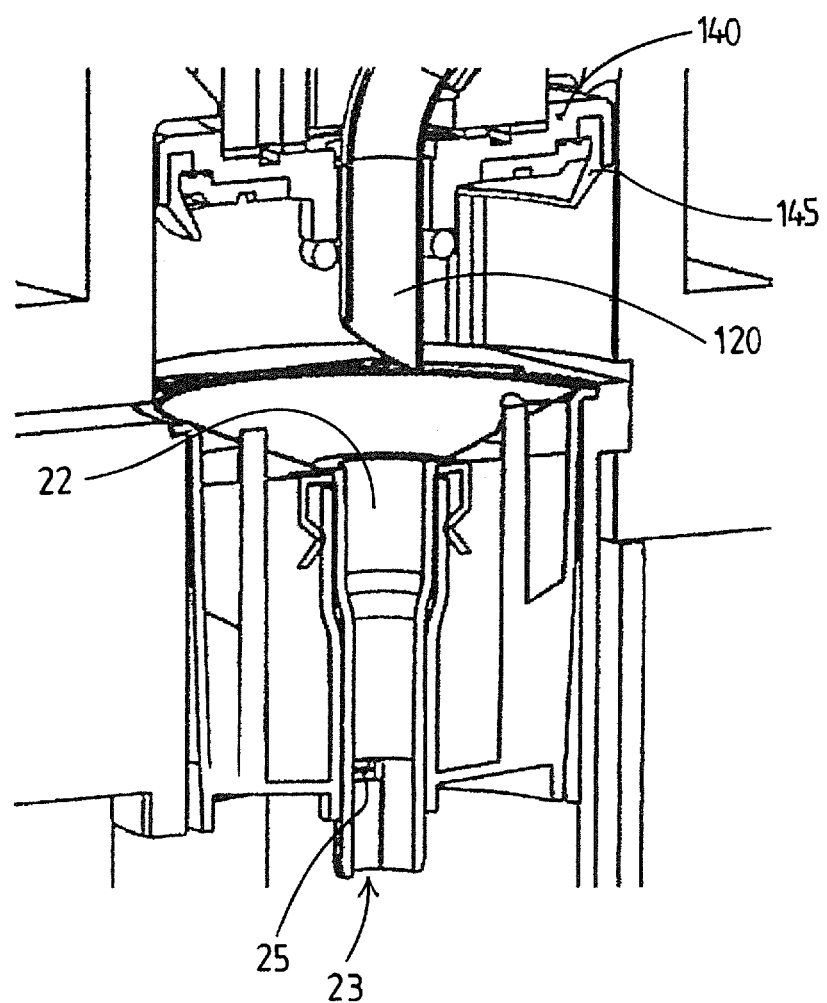
Figure 13:
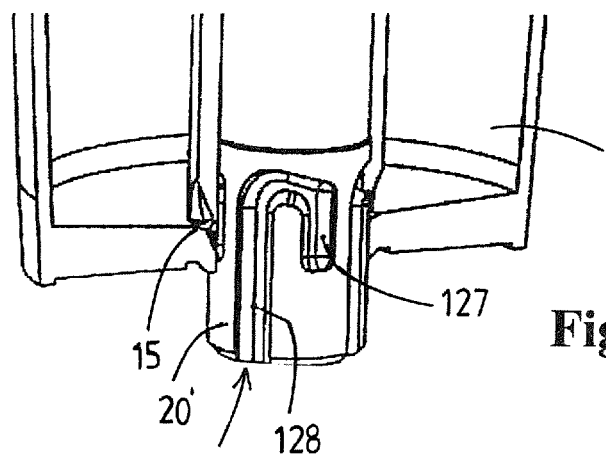
Figure 14:
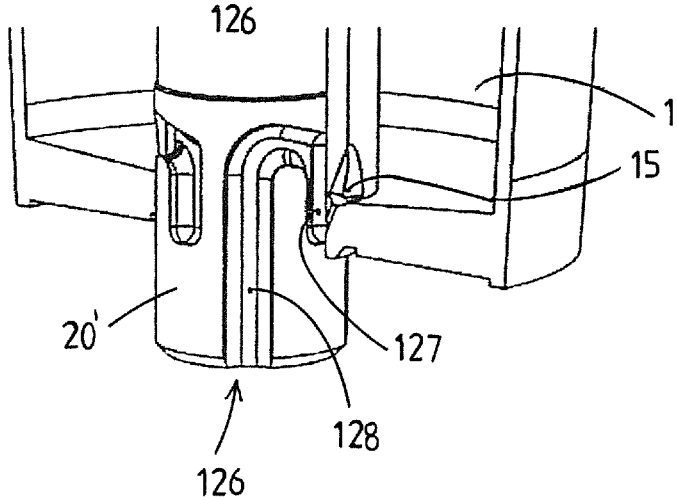
Figure 15:
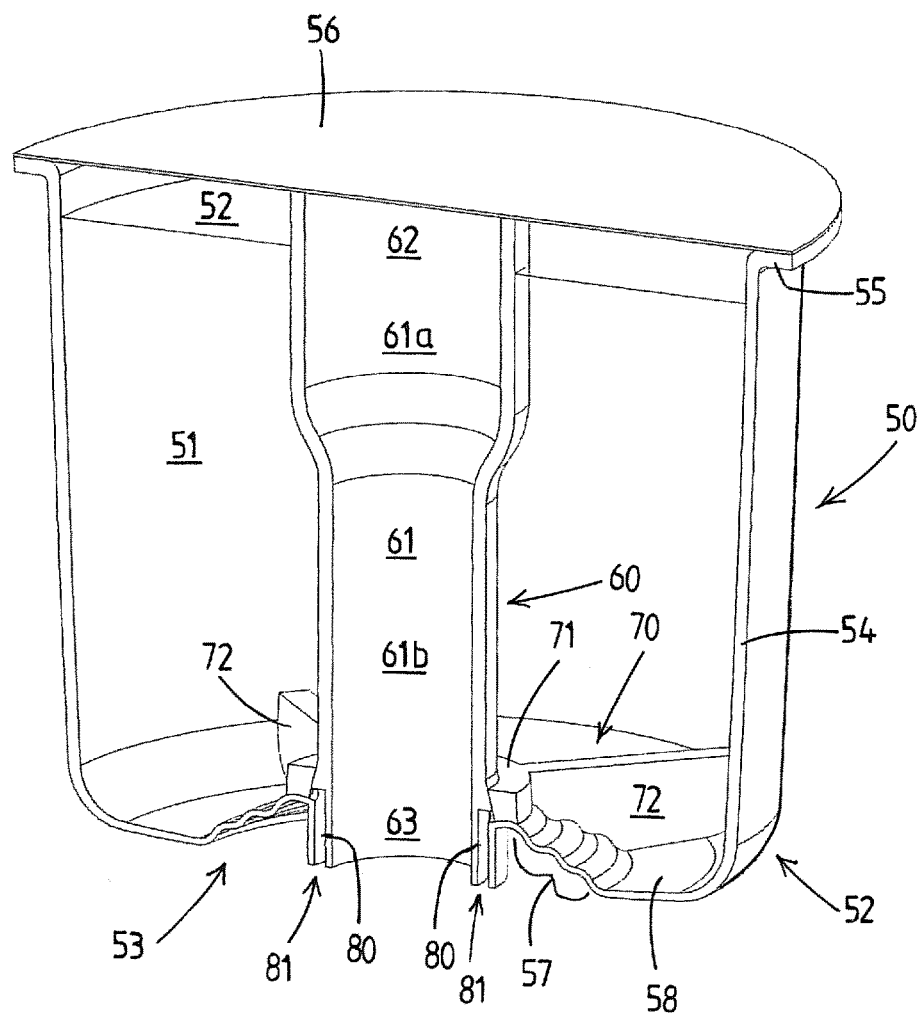
Figure 16:
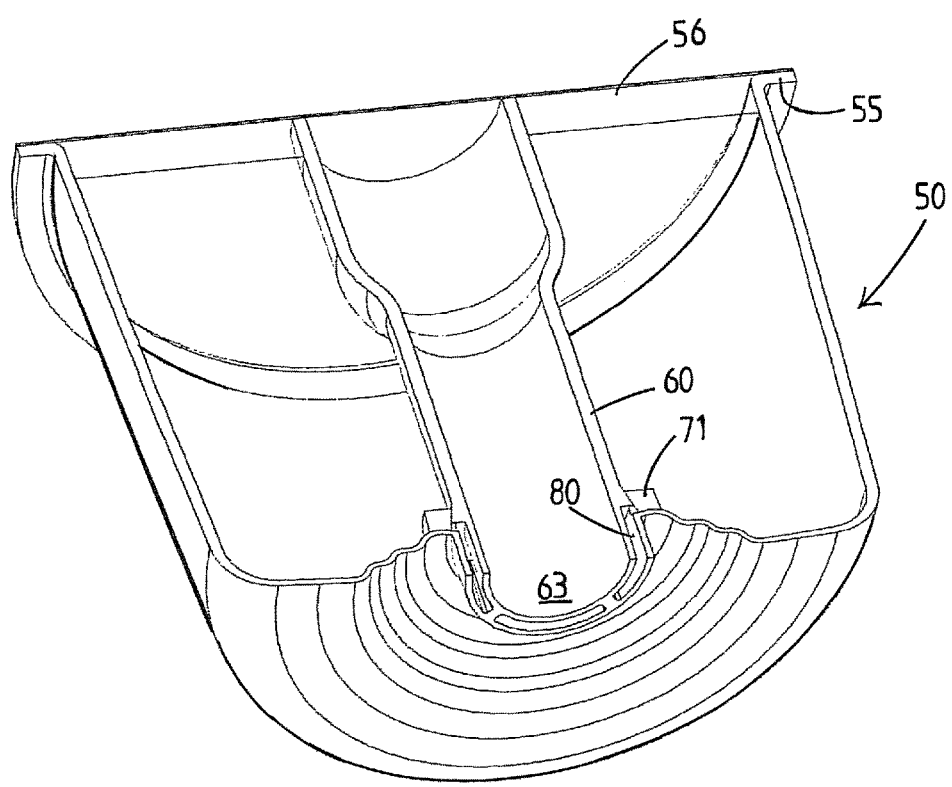
Figure 17:
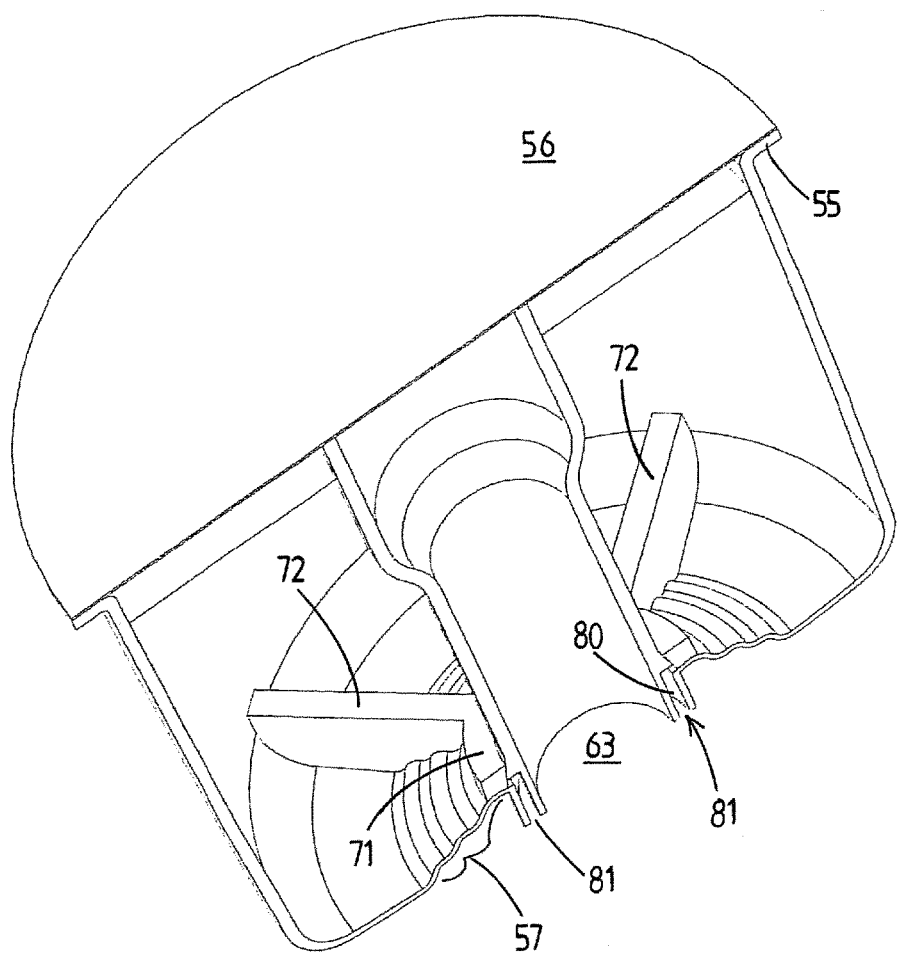
Figure 18:
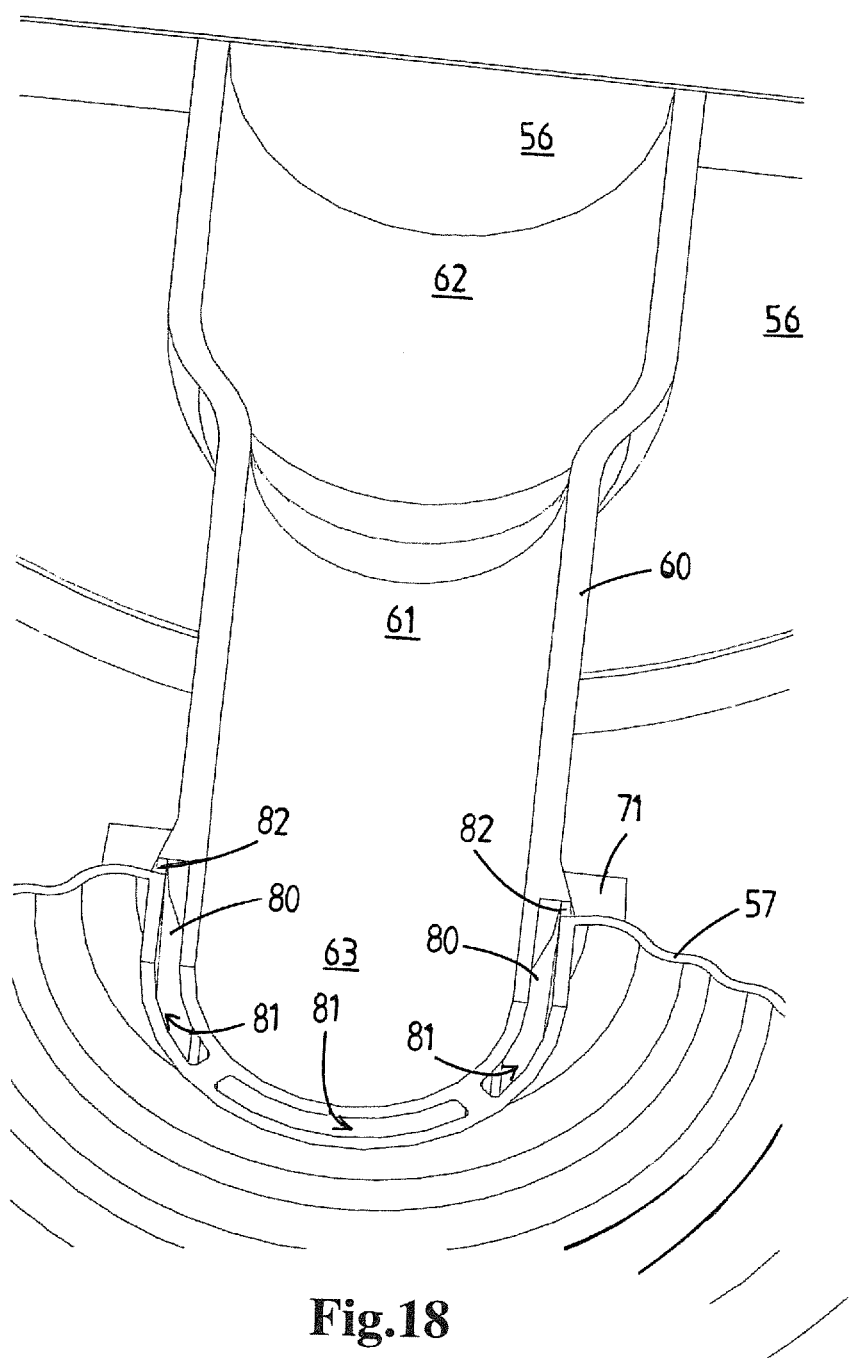
Figure 19:
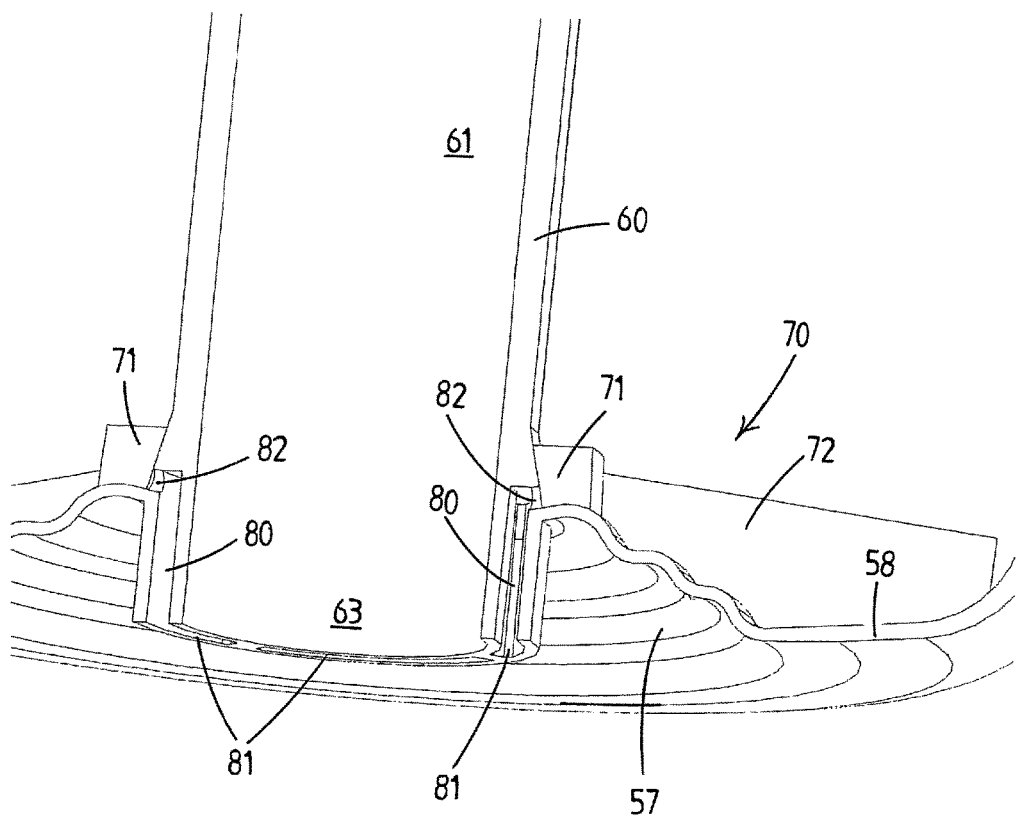
Figure 20:
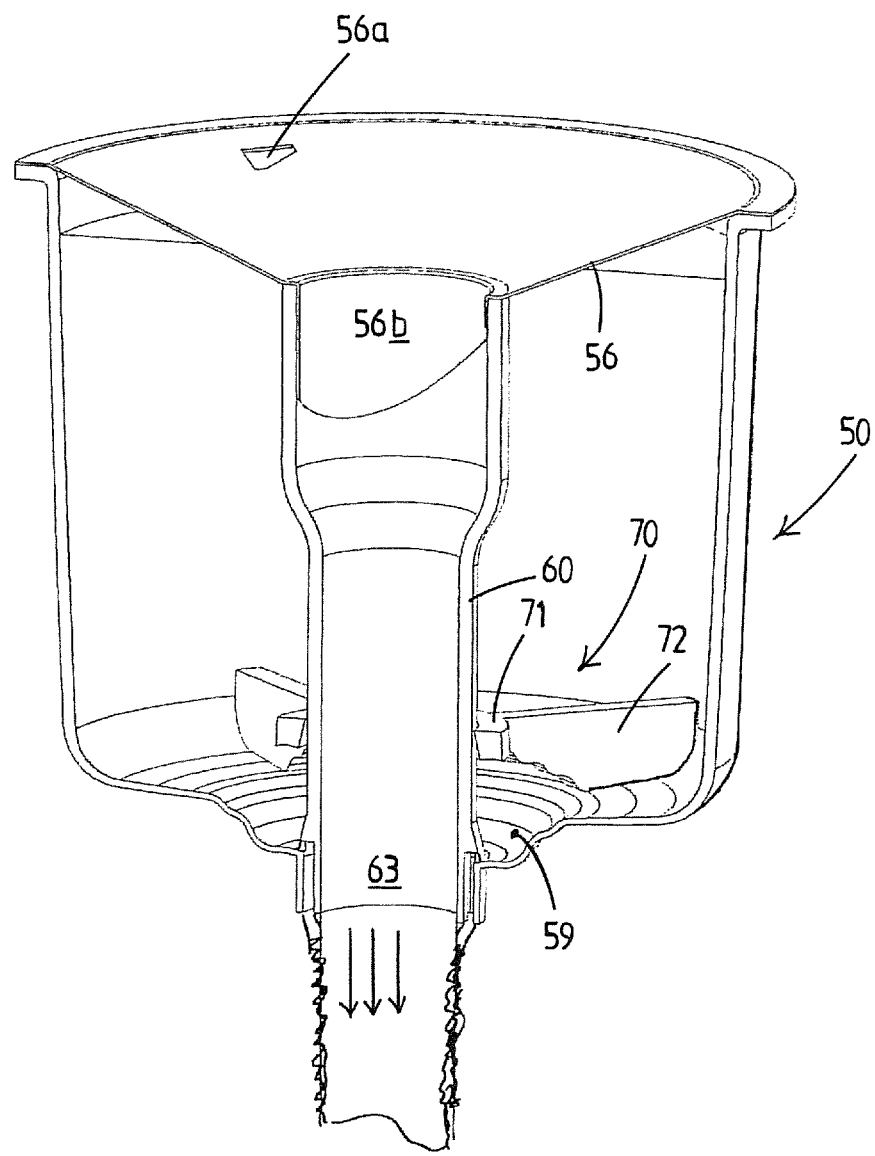
Figure 21:
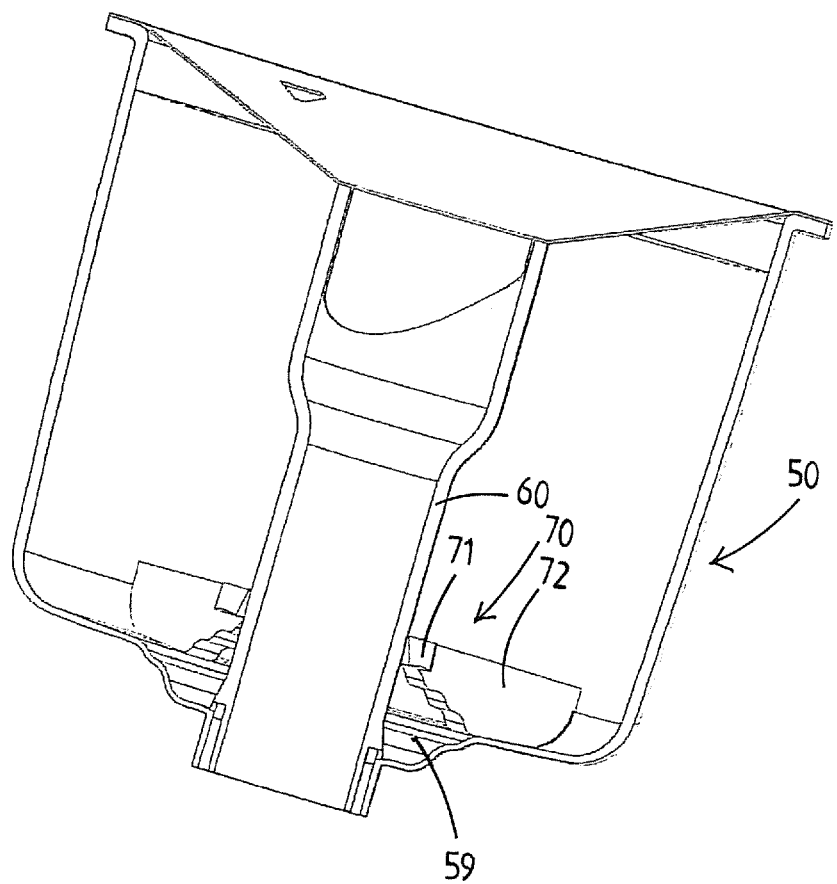
Figure 22:
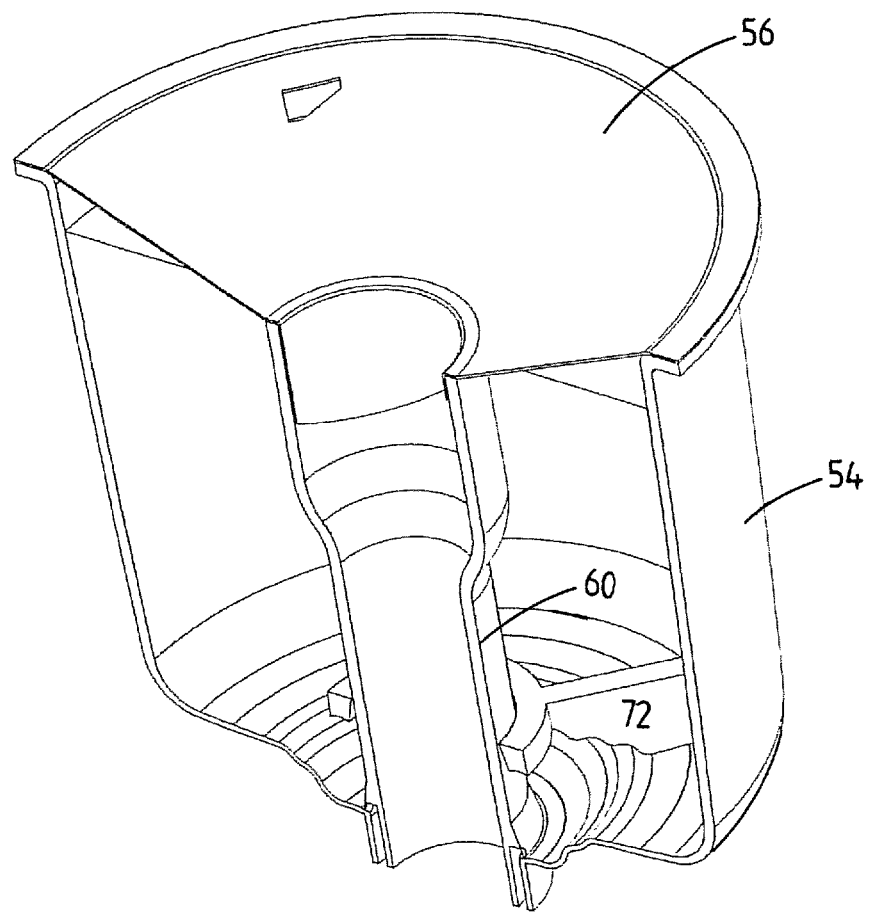
Figure 23:
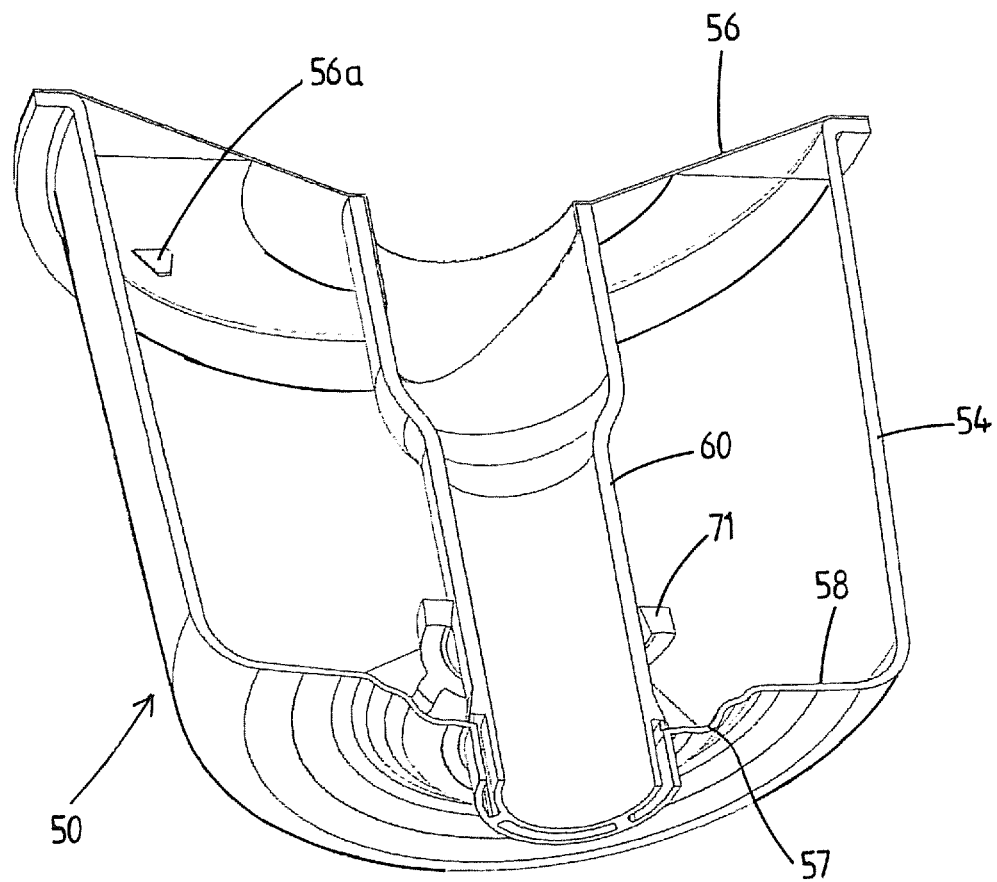
Figure 24:
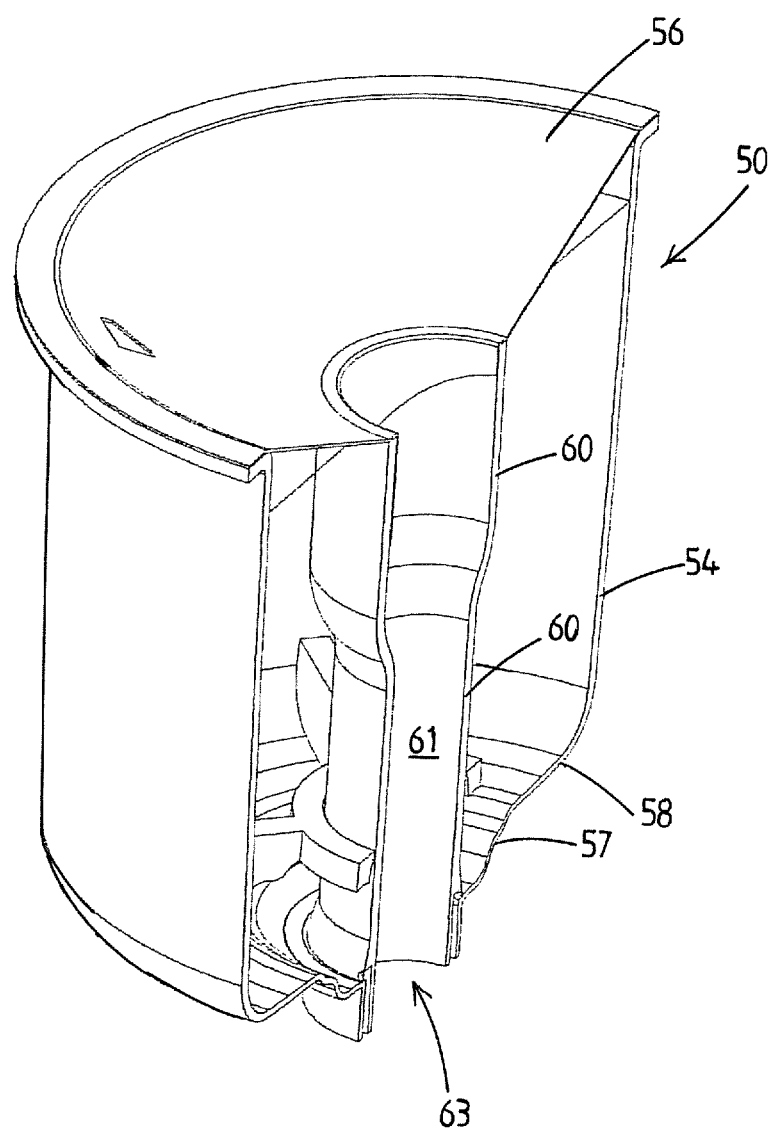
Figure 25:
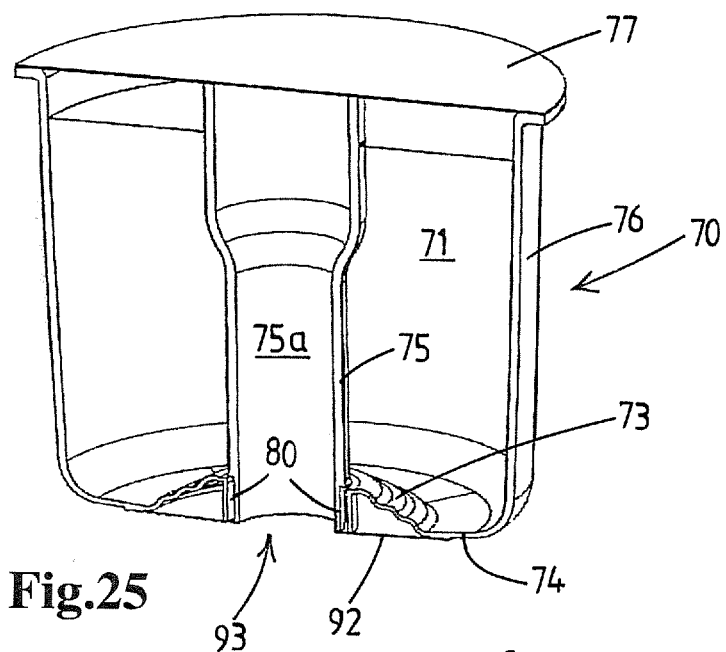
Figure 26:
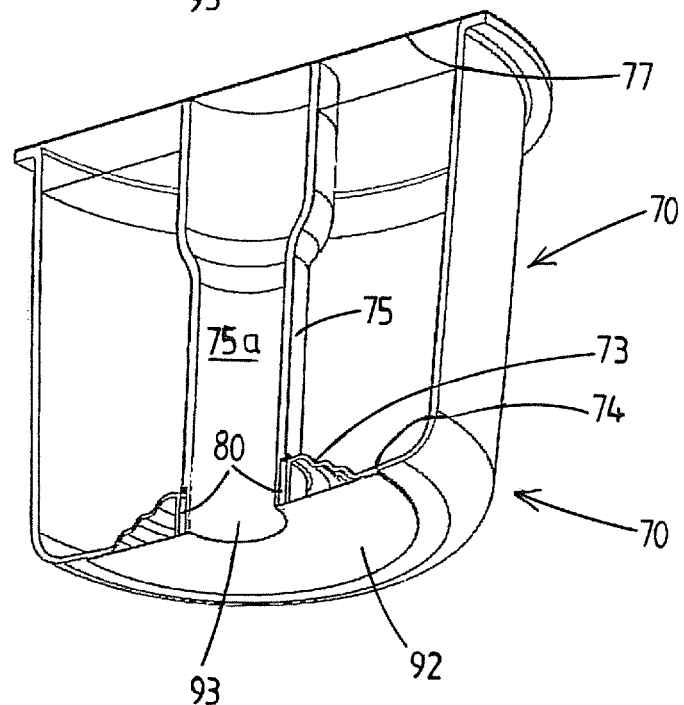
Figure 27:
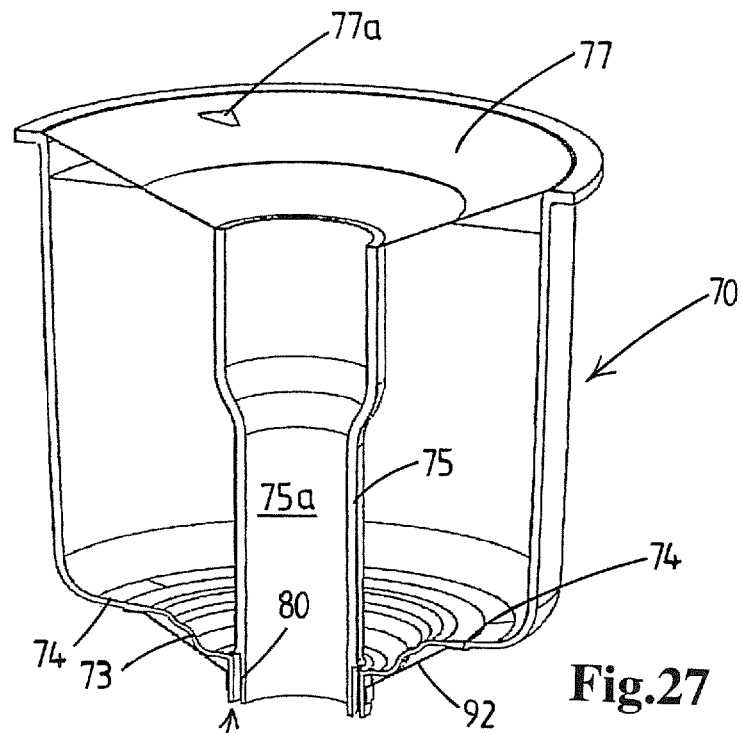
Figure 28:
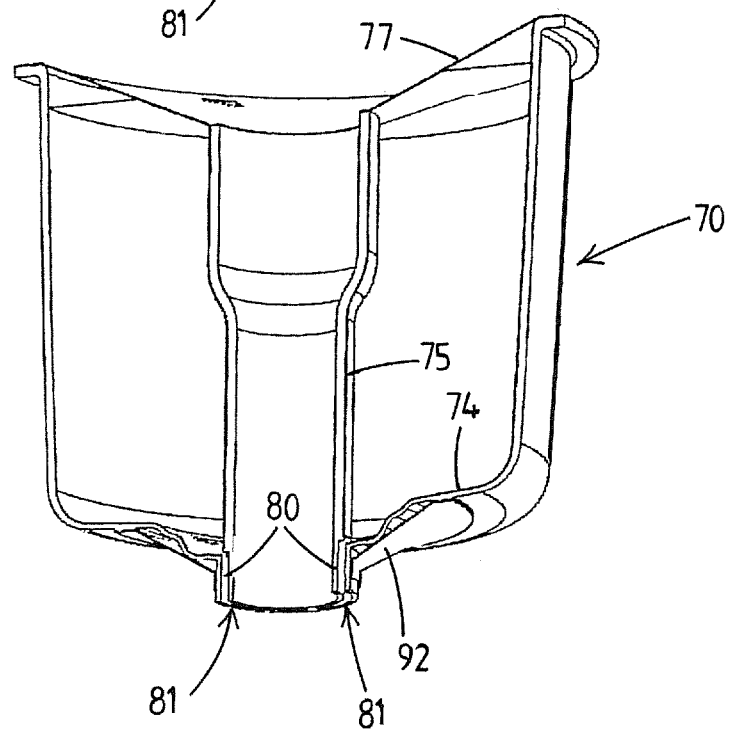
Figure 29:
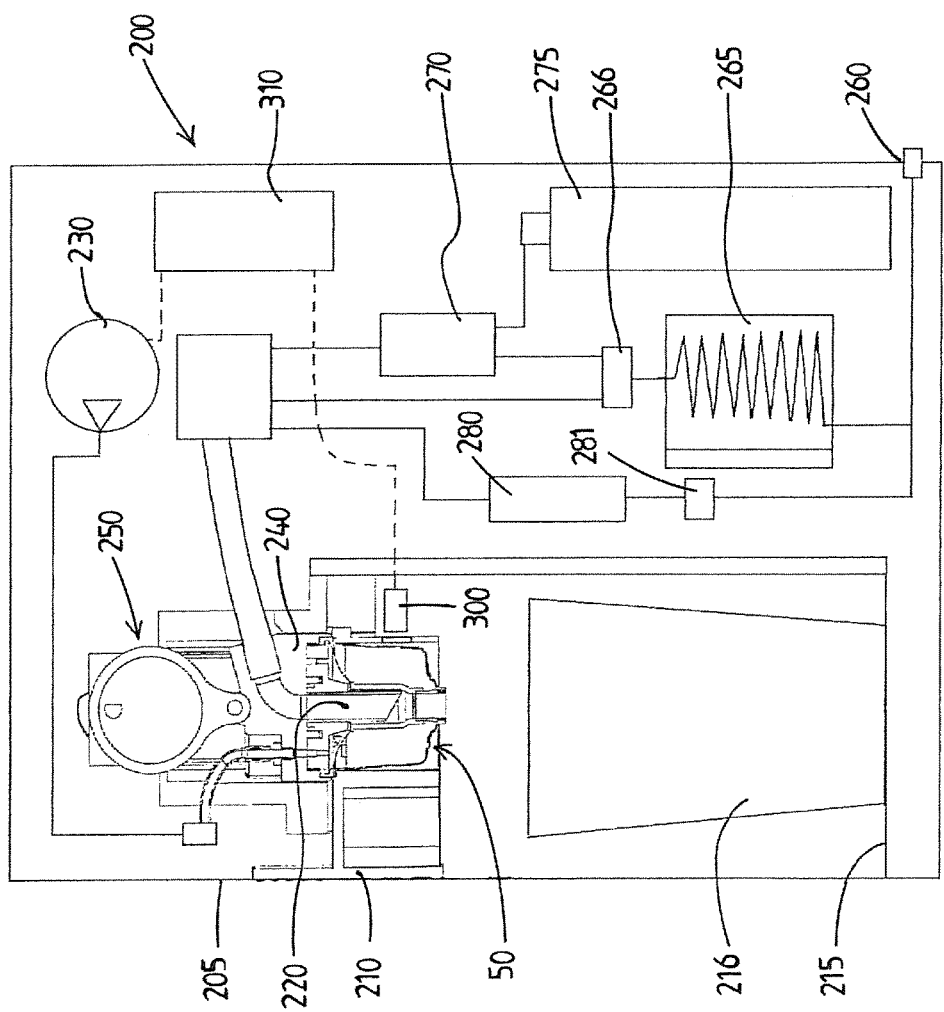

In the drawings:

FIG. 1 shows in cross-section an example of a disposable cartridge according to the invention filled with a single serve portion of a liquid ingredient, e.g. a beverage concentrate, to be combined with a base liquid for the preparation of a liquid product, with the valve member in sealed position thereof, FIG. 2 shows the cartridge of FIG. 1 with the valve member in lowered dispensing position thereof, FIG. 3 shows in perspective view components of a liquid food product preparation apparatus and the cartridge of FIG. 1 prior to placement in a cartridge holder of the apparatus, FIG. 4 shows the view of FIG. 3 with the cartridge placed in the cartridge holder, FIG. 5 shows the view of FIG. 5 with the cartridge holder moved to bring the cartridge to a dispensing location relative to the apparatus, FIG. 6 shows a cross section of the apparatus and cartridge in the situation of FIG. 5, prior to the start of a dispensing cycle, FIG. 7 shows the situation of FIGS. 5 and 6 in a perspective view, FIG. 8 shows the apparatus and cartridge in the situation wherein the pressurization dome member and liquid feed lance have been moved downwards to engage on the cartridge and the valve member respectively, with the valve member in its lowered dispensing position, FIG. 9 shows the situation of FIG. 8 in a perspective view, FIG. 10 depicts the supply of water, e.g. carbonated water via the lance to the channel in the valve member as well as the feed of pressurized gas, e.g. air, to the reservoir via the pierced top sealing film so as to assist the dispensing of liquid ingredient from the reservoir, FIG. 11 depicts the situation wherein the supply of water has ceased as well as the reservoir has been emptied, possibly with a final gas flow through the reservoir to guarantee its complete emptying and avoidance of dripping, FIG. 12 depicts the emptied condition of the cartridge with the pressurization dome member and liquid feed lance having been raised to their initial position allowing motion of the cartridge holder for removal of the cartridge, FIGS. 13 and 14 depict an alternative embodiment of the valve member, FIG. 15 shows in vertical cross section an another example of a disposable cartridge according to the invention filled with a single serve portion of a liquid ingredient, e.g. a beverage concentrate, to be combined with a base liquid for the preparation of a liquid product, with the valve member in sealed position thereof, FIG. 16 shows the cartridge of FIG. 15 in cross section and perspective view from below, FIG. 17 shows the cartridge of FIG. 15 in cross section and perspective view from above, FIG. 18 shows a portion of the cartridge of FIG. 15 on a larger scale, FIG. 19 shows a portion of the cartridge of FIG. 15 on a larger scale, FIG. 20 shows the cartridge of FIG. 15 in opened condition, FIG. 21 shows the cartridge of FIG. 20 in a different view, FIG. 22 shows the cartridge of FIG. 20 in perspective view from above, FIG. 23 shows the cartridge of FIG. 20 in a perspective view from below, FIG. 24 shows the cartridge of FIG. 20 in yet another perspective view, FIG. 25 shows in vertical cross section another example of a disposable cartridge according to the invention filled with a single serve portion of a liquid ingredient, e.g. a beverage concentrate, to be combined with a base liquid for the preparation of a liquid product, FIG. 26 shows the cartridge of FIG. 25 in perspective view from below, FIG. 27 shows the cartridge of FIG. 25 in opened condition, FIG. 28 shows the cartridge of FIG. 27 in perspective view from below, FIG. 29 shows schematically a beverage dispensing apparatus with the cartridge of FIG. 25 in opened condition.

With reference to the FIGS. 1-12 a first example of a disposable cartridge 1 filled with a single serve portion 2 of a liquid ingredient to be combined with a base liquid for the preparation of a liquid product will be described. FIGS. 13 and 14 illustrate an alternative of the valve member.

In this description, according to a preferred application of the invention, the liquid ingredient is a beverage concentrate that is to be combined with a flow of carbonated water to fill a single serve container, e.g. a drinking glass, with a single serving of a carbonated beverage.

In an embodiment the device also, or alternatively, is embodied to combine the liquid ingredient with non-carbonated water, e.g. hot or cold non-carbonated water. Generally carbonated water will be cold water.

Whilst use in the field of preparation of carbonated beverages is envisaged it will be clear that the inventive cartridge and/or apparatus can also be employed for the preparation of other liquid products, e.g. in the pharmaceutical field, etc.

The disposable cartridge 1 has an injection molded monolithic plastic body 2 with a bottom 3 having an underside 3a and with a circumferential wall 4, an upper edge 5 embodied as an outwardly protruding flange, of the circumferential wall bounding a filling aperture through which the cartridge can be filled with a liquid ingredient.

The filling aperture of the cartridge is hermetically sealed by a top sealing film 6, of which the circumference is fixed on the upper edge 5.

The bottom may e.g. have a diameter between 25 and 75 millimeters, e.g. between 40 and 60 millimeters. The circumferential wall adjoining the perimeter of the bottom may e.g. have a height between 25 and 75 millimeters, e.g. between 40 and 60 millimeters.

The bottom is provided with a molded aperture 8, e.g. formed by a downward protruding collar portion 9 of the bottom.

The plastic body further comprising a column 11 that is integrally molded with a portion of the bottom, here a central portion. The column 11 projects upwards from the bottom to an upper end of the column. Through the column a bore 12 extends from the upper end of the column 11 and ending in the aperture 8 in the bottom.

The plastic body bounds a reservoir that is at least partially filled with said liquid ingredient between said column 11 and the circumferential wall 4.

A tubular valve member 20 is slidably arranged in the bore 12 in the column 11, through which valve member a channel 21 extends from an inlet 22 at a top end of the valve member to an outlet 23 at a bottom end of the valve member 20. In this example, as preferred, the valve member 20 is vertically movable within the bore 12.

The column is provided with one or more first dispensing passages 15 between an exterior of the central column 11 and the bore 12.

The tubular valve member 20 is provided with one or more second dispensing passages 25, here extending between the exterior side of the valve member 20 and the channel 21 within the valve member 20.

In a raised sealing position of the valve member relative to the column 11, see FIG. 1, the one or more second dispensing passages 25 in the valve member 20 are out of register with the one or more first dispensing passages 15 in the column 11, such that the reservoir is closed.

In a lower dispensing position of the valve member 20 relative to the column 11, the one or more second dispensing passages 25 in the valve member 20 register with the one or more first dispensing passages 15 in the column 11, such that the reservoir is opened.

The top sealing film is pierceable, so that a base liquid feed lance 120 can be pierced through the top sealing film and connected to the inlet 22 of the channel 21 in the valve member, so that the base liquid can be fed into the channel. This liquid exits the channel 21 and thereby the cartridge from the outlet of the valve member.

The valve member 20 is movable downwards by a force exerted thereon by said base liquid feed lance 120 in order to move from the sealed position to the lower dispensing position, thereby opening the reservoir and allowing dispensing of liquid ingredient from the reservoir via said first and second dispensing channels 15, 25.

In this embodiment it is envisaged that the one or more second dispensing passages 25 are arranged such that the dispensed liquid ingredient is combined with the base liquid within the channel 21 prior to exiting said channel, noting that further blending may occur as the combined liquid travels to the drinking receptacle or even in the drinking receptacle, e.g. glass.

It will be appreciated that in the design shown in FIGS. 1-12 the valve member has an exterior side and an interior side that delimits the channel 21, wherein the one or more second dispensing passages 25 are embodied to extend between said exterior side and interior side of the valve member.

It will be appreciated that in the design shown in FIGS. 1-12 the outlet of the valve member 20 forms the actual dispensing outlet for the combined base liquid and liquid ingredient.

In view of further appreciation of the cartridge depicted in FIGS. 1 and 2 and its cooperation with an appropriate dispensing apparatus, e.g. beverage preparation and dispensing apparatus, now the preparation of a beverage or other liquid product will be discussed with reference to FIGS. 3-12. It is noted that other cartridges discussed herein can be used in conjunction with the same apparatus and dispensing can be achieved on the basis of the same principles.

FIGS. 3-12 depict components of an apparatus 100 including
- a housing 105,
- a holder 110 that here is movable relative to the housing 105, here a sliding drawer, for accommodating and retaining the cartridge 1 at a dispensing location in the apparatus,
- a base liquid feed assembly with a base liquid feed lance 120 that is disposed at the dispensing location, which lance 120 is embodied to pierce through the top sealing film 6 of the cartridge 1 and to connect to the channel 21 of the valve member 20 of the cartridge 1, so that base liquid can be fed into the channel 21.

The apparatus 100 is provided with a pressurized gas source, preferably a pressurized air source, e.g. an air pump or gas bottle, here schematically depicted at 130.

The apparatus 100 is adapted to bring the pressurized gas source 130 in direct communication with the reservoir of the disposable cartridge 1 so as to allow the liquid ingredient therein to be pressurized by said gas thereby assisting the dispensing of the liquid from the reservoir when the valve member 20 of the cartridge 1 has been brought into the dispensing position thereof. This is advantageous if the liquid ingredient is rather viscous and also allows for control of said dispensing, e.g. in view of the ratio between the liquid ingredient and the base liquid, e.g. during a dispensing cycle of a single beverage. The gas pressure control may also be used to compensate, if needed, for any temperature dependent viscosity effect of the liquid ingredient, e.g. increasing gas pressure when the liquid ingredient is cold. In an embodiment the apparatus may comprises a temperature sensor adapted to sense the temperature of the liquid ingredient and/or of the cartridge at the start of the dispensing cycle, e.g. when placed in the holder of the apparatus or when arriving at or moving to the dispensing location. One can also envisage a user inputting said temperature, e.g. "cartridge taken from refrigerator" and "ambient temperature cartridge". One can also envisage the top sealing film have a temperature responsive coloring area, that changes color due to temperature change and thereby provides an indication of the actual temperature of the liquid ingredient. The apparatus may then have a sensor reading the temperature or an indicator thereof on the cartridge, or the user may be guided to provide the correct input for the apparatus.

The apparatus 100 comprises a pressurization dome member 140 having along a periphery thereof an outer gas seal 145 that is adapted to sealingly engage the disposable cartridge 1 around a location where the top sealing film is pierced to allow entry of pressurized gas into the reservoir. Here the outer gas seal 145 is embodied to seal onto an upper end 5 of a circumferential wall of the disposable cartridge 1.

The pressurized gas source 130 is connected to the dome member 140 so as to allow feeding of pressurized gas beneath the dome member 140 within the space sealed by the outer gas seal thereof that sealingly engages the disposable cartridge. As the top sealing film has been pierced, e.g. in a manner to be discussed below, this supply of pressurized gas, e.g. air, pressurized the liquid ingredient.

The base liquid feed lance 120 here protrudes from the dome member 140. The lance and the dome member 140 are integrated so as to move in unison.

The lance 120 is provided with a gas seal 146, here an O-ring, that seals onto the top end of the column to avoid entry of pressurized air into the channel.

The dispensing apparatus has an operable displacement device 150, here with an excenter mechanism 151 and an electric motor 151, which is adapted to produce a movement of the dome member 140 and lance 120 relative to the cartridge 1 that is held in the holder 110.

When the displacement device 150 is operated the lance 120 pierces the top sealing film 6 and connects to the channel 21 of the valve member 20. Continued downward motion of the lance 120, here along with the dome member 140, causes the base liquid feed lance to move the valve member 20 to the dispensing position thereof, thus pressing the valve member downwards from the raised sealing position to the lower dispensing position thereof and thereby allowing the dispensing of beverage concentrate or the like from the cartridge 1.

As discussed the liquid feed assembly is equipped for feeding in water as the base liquid, e.g. carbonated water, e.g. selectively carbonated and non-carbonated water, here via hose 121. For example the liquid feed assembly comprise a pump for the base liquid and/or the liquid feed assembly is connected to a water mains, e.g. via an intermediate heat exchanger for cooling and/or heating said liquid, and/or via an intermediate carbonator for causing carbonization of the water.

The holder 110 for the cartridge 1 is equipped to accommodate and retain the cartridge in a substantially horizontal position with the bottom downwards. The holder has an aperture below the bottom of the cartridge 1 in such a way that during dispensing of the liquid product said product remains clear of the holder. This avoids undue disturbance of the flow, e.g. avoiding reduction of the carbon dioxide content of the liquid product and/or soiling of the apparatus and/or cross contamination between successive servings.

At a distance below the dispensing location of the holder the apparatus has a standing place for a mug or other receptacle, e.g. a drinking glass.

The user starts here by sliding open the drawer 110 and placing the cartridge in a corresponding cavity in the drawer 110. As is preferred the cartridge is now suspended from its upper flange as the holder forms a corresponding support surface for said upper flange. Now the user closes the drawer 110 by sliding it with the cartridge 1 into the housing so that the cartridge is moved to the dispensing location of the apparatus 100. This situation is depicted in FIGS. 6, 7.

The displacement device 150 is now operated so that the lance 120 pierces the top sealing film 6 and connects to the channel 21 of the valve member 20. Continued downward motion of the lance 120, here along with the dome member 140, causes the base liquid feed lance to move the valve member 20 to the dispensing position thereof, thus pressing the valve member downwards from the raised sealing position to the lower dispensing position thereof and thereby allowing the dispensing of beverage concentrate or the like from the cartridge 1.

As is preferred, the cartridge is provided with one or more piercing members 28, here two, that are arranged underneath the top sealing film 6, so that pressing the top sealing film downwards, here by the base liquid feed lance 120, causes said one or more piercing members 28 to engage the top sealing film and the locally rupture the top sealing film thereby providing one or more holes that allow for introduction of pressurized gas into the reservoir in order to pressurize the liquid ingredient therein so as to assist dispensing thereof via the dispensing passages when the valve member 20 is in the dispensing position thereof. In this example the one or more piercing members are embodied as one or more integrally molded spike formations.

This situation is depicted in FIGS. 8 and 9.

Now the supply of carbonated water as well as of pressurized gas, e.g. air, is started, possibly with some timed delay of the one relative to the other. The liquid ingredient is now assisted in its travel through the first and second dispensing passages and in this embodiment blends with the water travelling through the channel 21 prior to the blended liquid exiting the channel via the outlet thereof. This process is depicted in FIG. 10.

Once the single serving is prepared the flow of water or other base liquid is stopped. If desired some gas flow may be continued to fully empty the cartridge and/or to assure that the final drops of liquid ingredient, e.g. beverage concentrate, are discharged. This avoids loss of ingredient and soiling of the apparatus. This is depicted in FIG. 11.

FIG. 12 depicts the end of the dispensing cycle, wherein the dome member 140 and lance 120 have been moved to their initial position, clear from the cartridge 1, allowing the removal of the cartridge 1, here by opening the drawer 110 and taking out the cartridge.

In FIGS. 13 and 14 an alternative embodiment of the cartridge 1 has been shown, in particular as concerns the embodiment of the second dispensing passages 125 of the valve member 20'.

The valve member 20' has an exterior side and an interior side that delimits the channel 21. The one or more second dispensing passages 125 are embodied as one or more dispensing grooves in the exterior side of the valve member. These one or more dispensing grooves 125 have a groove outlet 126 from which the liquid ingredient is dispensed. In practice, even whilst the outlet is not adjoining the channel or outlet thereof, the liquid ingredient flows directly to join the outflow of (carbonated) base liquid so as to blend therewith. It has been found that this joining of one or more subflows of liquid ingredient, e.g. beverage concentrate, on the exterior of the valve member (or other dispensing duct member of a disposable cartridge) with a water flow, e.g. of carbonated water, through the interior of the valve member or duct member avoids undue loss of carbonization of the water whilst providing an acceptable blending.

In a preferred embodiment between three and six groove outlets are disposed around a lower end portion of the valve member 20'.

The discharge grooves 125 on the exterior side of the valve member here each have a collector groove portion 127, which in the dispensing position of the valve member, acts as receptacle for liquid ingredient, e.g. said liquid ingredient being jetted from an associated first dispensing passage 15 under the influence of the pressurization of said liquid ingredient by pressurized gas. A further portion 128 of said groove 125 adjoins said collecting portion 127 so as to allow said liquid ingredient to overflow, e.g. like a siphon, said collector portion and then flow downwards towards an outlet of said groove. This tortuous path avoids the high speed collision of liquid ingredient jet with carbonated water, as the bends in the path and/or the collector groove portion reduce the speed of the liquid ingredient. It will be appreciated that the grooves 125 may have other tortuous designs.

As can be seen in the FIGS. 1-12 the channel 21 in the valve member 20 has an upper portion with a first diameter and an adjoining lower portion extending up to the outlet. This lower portion and the outlet have a second diameter. The first diameter is greater than the second diameter. It is shown that the base liquid feed lance 120 has an insertion portion adapted to be inserted into the wider upper portion of the channel 21. The feed lance 120 has an internal feed channel therein having a feed channel diameter substantially equal to this second diameter, e.g. between 0.9 and 1.1 times the second diameter, thereby avoiding undue constriction and/or expansion of the flow of base liquid when passing from the feed lance into the second portion of the channel.

This is also beneficial in view of loss of carbonization when carbonated water travels through the lance and the connected valve member.

It is shown here that the bore 12 has an upper portion with a first diameter and an adjoining lower portion with a second diameter smaller than said first diameter, and the exterior of the valve member 20 has an upper portion with a diameter so as slidably fit in said upper portion of the bore and a lower portion so as to slidably fit in said lower portion of the bore. It is shown that the bore has a shoulder, e.g. between said upper and lower portion of the bore, and the valve member has on the exterior side thereof an abutment surface adapted to rest against said shoulder in the dispensing position of the valve member.

It is shown that the valve member and the bore—at least in the sealed position of the valve member—form one or more seals between them, e.g. in an embodiment according to FIGS. 1, 2 a seal between them that shields the one or more dispensing passages from the atmosphere.

It is illustrated that the cartridge body is a rigid body with the bottom maintaining its shape when the valve member 20 is moved between its sealing position and dispensing position, e.g. moved vertically downward between said positions.

It is illustrated that the cartridge body comprises a column 11, e.g. a column that is integrally molded with a portion of the bottom, e.g. a central portion of the bottom, which column 11 projects upwards from the bottom to an upper end of the central column, through which column the bore 12 extends from the upper end of the column and ends in said aperture in the bottom.

It is illustrated that the cartridge body is an injection molded monolithic plastic body.

In an embodiment the cartridge may have a bottom sealing film, which is placed along the underside of the bottom to hermetically seal the aperture and/or the outlet of the valve member. In such embodiment, preferably, the valve member is movable vertically downward from said sealed position to said dispensing position, wherein the bottom sealing film is pierceable and is placed so as to be engaged and pierced by the valve member when the valve member is moved down to the dispensing position thereof, said piercing of the bottom sealing film causing opening of said outlet of the channel of the valve member and/or of the aperture.

It is shown that the top end of the valve member rests against, here is sealed to, the top sealing film 6 when the valve member 20 is in the sealing position.

It is shown that the cartridge body forms a supporting surface of the cartridge, which supporting surface lies at a distance below the bottom, e.g. below—when present—a bottom sealing film, so that the bottom or bottom sealing film lies higher than any bearing surface when the cartridge is placed on it.

It is shown that the cartridge body has a circumferential wall having an upper rim bounding an opening, wherein a top sealing film is fixed to said upper rim, e.g. embodied as an outwardly projecting flange 5, e.g. said radially projecting flange being embodied to support the cartridge on a bearing surface of a dispensing device. As is preferred the outer gas seal engages also on said upper rim or on the top sealing film on or adjacent the upper rim.

It is shown that the valve member is provided with one or more snap portions 29 adapted to form a snap fit as the valve member is moved into the dispensing position thereof.

It is shown that the outlet of the channel has a diameter between 6 and 10 millimeter, e.g. about 8 millimeter.

It is shown that the cartridge body has a circumferential wall around the perimeter of the bottom and wherein the bore is concentric relative to an axis of the circumferential wall of the cartridge.

With reference to FIGS. 15-24 now another example of a disposable cartridge will be discussed, which cartridge 50 is filled or can be filled (when the top seal is not yet applied) with a single serve portion of a liquid ingredient to be combined with a base liquid for the preparation of a liquid product, e.g. a liquid food product suitable for human consumption, e.g. a beverage concentrate to be combined with water, e.g. carbonated water, for the preparation of a beverage.

The disposable cartridge 50 is filled with a single serve portion of a liquid ingredient 51, preferably to a level so that a head space 52 is present above the liquid ingredient.

The liquid ingredient 51 is in this example a beverage concentrate to be combined with water, here carbonated water, for the preparation of a beverage for human consumption.

The cartridge has a molded plastic cartridge body 52 with a bottom 53 and a circumferential wall 54 that extends upward from the periphery of the bottom 53 to a top of the body 52.

Here, as preferred, the top edge of the circumferential wall 54 is provided with an outwardly protruding circumferential flange 55, that extend around a filling aperture for filling the liquid ingredient into the cartridge.

The body 52 delimits a reservoir that is filled with the single serve portion of liquid ingredient 51.

As can be seen the filling aperture is in communication with this reservoir.

The aperture is hermetically sealed by a top sealing film 56 that is secured to the circumferential wall 54, here, as preferred, to the flange 55 thereof. For example the top sealing film is heat-sealed to said flange 55 after the reservoir has been filled.

The cartridge body 52 further comprises a column 60 having a portion that projects upwards from the bottom 53 to an upper side of the column 60.

Here, as preferred, the column 60 is a central column that is centrally arranged within the cartridge 50. Here the circumferential wall is circular in cross-section, as preferred, and the column 60 is arranged on the vertical axis of the circumferential wall.

As is preferred the column 60 is integrally molded with the bottom, here a central portion of the bottom, so that the entire body can be manufactured in an injection mold and no later assembly of the column 60 is needed.

A vertical channel 61 extends through the column 60 from an inlet 62 at a top end thereof to an aperture or outlet 63 in the bottom 53 of the cartridge body 52.

The bottom 52 has a flexible portion 57 adjacent, here around the column 60, such that the column 60 is movable downwards by a force exerted thereon relative to the top of the body, here relative to the upper edge of the circumferential wall of the body, between a higher initial position (FIG. 15) and a lower dispensing position (FIG. 20).

As preferred the top end of the column 60 rests against the top sealing film 56 when the column is in the higher initial position. Even more preferred the top end is connected to the top sealing film, e.g. heat-sealed, so as to achieve a sealed connection separating the channel inlet from the reservoir.

A valve member 70 is arranged within the cartridge 50 and outside of the column 60. As will be apparent from the figures and this description the valve member 70 is stationary arranged within the cartridge 50 so as to be movable, e.g.

slidable, relative to the column 60 when the column is moved from its higher initial position (FIG. 15) to its lower dispensing position (FIG. 20).

The cartridge body 51 is provided with one or more dispensing passages 80 that are arranged to dispense the liquid ingredient 51 from the reservoir.

In the higher initial position of the column 60, the valve member 70 closes the one or more dispensing passages 80, such that the reservoir is closed.

In the lower dispensing position of the column 60, made possible by the flexing portion of the bottom, the valve member has remained in place and thereby has effectively moved away from the inlets of the one or more dispensing passages 80, such that the reservoir is opened and liquid ingredient can be dispensed via the one or more passages 80.

The cartridge 50 can be placed in the apparatus described herein before, wherein the base liquid feed lance 120 is connectable to the inlet 62 of the channel 61 in the column 60, so that the base liquid, e.g. carbonated water, can be fed into the channel 61 and exit the cartridge 50 via the aperture 63 in the bottom of the cartridge.

In an embodiment, as here, the column 60 has a lower portion that extends below the flexible portion of the bottom, so that the aperture 63 is vertically spaced from said flexible portion.

In general the one or more dispensing passages 80 are arranged such that the dispensed liquid ingredient is combined with the base liquid within the channel or, in this example, at or near the aperture or outlet 63 of the channel.

It is illustrated that the bottom, or the lower portion of the column 60, provides a series of outlet openings of the one or more dispensing passages 80 that are arranged in a circular arrangement around the outlet or aperture from which the base liquid, e.g. carbonated water emerges. In a preferred embodiment the one or more outlet openings 81 are arranged to dispense the liquid ingredient basically as an annular shroud around the jet of base liquid. The jetted base liquid and liquid ingredient adjoin one another rather immediately after they emerge from the cartridge and in the further duration of travel they intermix, possibly with a final mixing occurring as the mixture swirls into the glass or other beverage drinking container. It is noted that said mixing is in particular seen when carbonated water is used as base liquid and then this manner of combining the liquid ingredient with the carbonated water is greatly beneficial for keeping the carbondioxide in the base liquid. In contrast, an effective jetting of one or more streams of liquid ingredient into the stream of carbonated water is observed to agitate the carbonated water in undue manner and thereby cause much of the carbondioxide to escape so that the final beverage contains limited carbondioxide.

It is illustrated that the dispensing passages 80 have multiple, here four, outlet openings 81 in the end face of the lower portion of the column.

The dispensing passages 80, here four, also have one or more inlets 82 that are initially closed by the valve member 70. It is illustrated that each passage 80, here four, has a single inlet 82 but other arrangements, e.g. with multiple inlets for a single passage or multiple passages linking to a common inlet, are also possible.

It is illustrated that an inlet 82 is oriented at an angle relative to the passage 80 such that a jet of liquid ingredient emerging from an opened inlet, e.g. due to pressurization of the liquid ingredient as discussed herein, collides against a wall portion of the passage thereby reducing, preferably annihilating, the speed of said jet.

In a most desired manner, even with a jetting of liquid ingredient from the inlet 82, the liquid ingredient effectively streams down mainly under the influence of gravity with the stickiness of the liquid ingredient in combination with an appropriate narrow shape of the passage maintain a slow speed of the emerging liquid ingredient.

Effectively it is desirable for the passage 80 to act as a flow resistor for the liquid ingredient, so that pressurization of the liquid ingredient as discussed herein using pressurized gas, can be used to cause an even stream of liquid ingredient from the one or more dispensing passage outlets 81.

In an embodiment the width, here the radial distance between opposing vertical wall portions, of the dispensing passages is about 0.8 mm. Here the outlet or dispensing aperture 63 has a diameter of about 10 mm. For example the dispensing passage outlet or outlets 81 are within 0.4 to 1.0 mm from the dispensing aperture 63 so that the shroud flow of liquid ingredient will easily adjoin the flow of base liquid, in particular when carbonated water is employed.

The valve member 70 can be manufactured as a separate component that is assembled into the cartridge. It is however more preferred to embody the valve member 70 by means of co-injection molding of the valve member after the body 52 has been molded. As will be appreciated the valve member 70 should not become unitary with the body 51 in such a manner that it would be solidly fused to the column and the flexible portion of the body so as to obstruct the illustrated way of operation of the valve member and cartridge.

It is proposed to co-inject the valve member 70 such that only a light adherence, or even no adherence at all, is created between the plastic of the valve member and the plastic of the body 52 including the column 60. This can be realized by selecting non-compatible plastics, e.g. the body can be made of amorphous plastic, for example of PP. The valve member can be molded from crystalline plastic, e.g. polycarbonate PC or ABS. These combinations allow to obtain a light adherence of the valve member 70 to the surfaces of the body 52 that are in contact with the valve member.

It is illustrated that the valve member has an annular portion 71 surrounding the column 60, which annular portion 71 has a sealing face that extends over the inlets 81 of the passages 80 and is in sealing contact with a corresponding annular sealing face around the lower end of the column 60.

In order to maintain the stationary position of the valve member 70 when the column 60 is pressed down, the valve member 70 here has one or more spoke portions 72 that extend away from the annular portion 71 to be supported on a non-flexing portion 58 of the bottom and here, as is preferred also extending to support against the circumferential wall 54 of the body.

It is illustrated that the non-flexing bottom portion 58 extends around the flexing portion 57 of the bottom.

For example three or four spokes extend away from the annular portion 71.

As can be seen in FIG. 20, the valve member 70 does not follow a downward motion of the column, with the result that the valve member no longer covers or closes the one or more inlets 82 of the one or more passages 80. Even when, as here, the valve member 70 was molded to extend over the flexing bottom portion 57, the non-adherence or light adherence allows the flexing portion to deform and move away from the valve member.

As is illustrated it is envisaged that the flexing bottom portion, in the downward dispensing portion of the column, forms a downward funnel 59 so that residual liquid can reach the inlets 82 that are, optimally, arranged near the lower end of the column 60 and thus at the bottom of the funnel 59. If, as desired, the flexing bottom portion 57 flexes back to or substantially into its initial position the same arrangement avoids or further hinders any residual leakage of liquid ingredient from the cartridge after a beverage or the like has been prepared and the feed lance 120 has been moved upwards, even in case the valve member 70 does not seal again the inlets 82.

FIG. 20 also illustrates the piercing or otherwise rupturing of the top sealing film 56 in order to allow entry of pressurized gas into the reservoir for the purpose of pressurization of the liquid ingredient within the reservoir. This may be done by one or more spike members or the like formed integrally with the body of the cartridge underneath the film 56. Here such a piercing is shown at 56a. The piercing by the lance 120 of the portion of the film covering the inlet of the channel 61 is shown at 56b.

FIG. 20 very schematically illustrates how the, rather slow moving, streams of liquid ingredient adjoin the outside of the central jet of base liquid, here carbonated water, and in the further course of travel into the drinking vessel gradually intermix with the base liquid. In case of carbonated water it is preferred that the emerging streams of liquid ingredient do not intersect the water flow but rather flow along and then adjoin, preferably as an annular shroud, the water flow.

As discussed with reference to the cartridge of FIG. 1 the channel in the column has an upper portion 61a with a first diameter and an adjoining lower portion 61b extending up to said aperture or outlet 63, said lower portion and outlet having a second diameter, wherein the first diameter is greater than said second diameter.

The base liquid feed lance 120 has an insertion portion adapted to be inserted into said upper portion 61a of the channel, wherein said feed lance has an internal feed channel therein having a feed channel diameter substantially equal to said second diameter, e.g. between 0.9 and 1.1 times the second diameter, thereby avoiding undue constriction and/or expansion of the flow of base liquid when passing from the feed lance into the second portion of the channel.

With reference to FIGS. 25-28 now another example of a disposable cartridge according to the invention will be discussed.

The cartridge 70 is filled with a single serve portion of a liquid ingredient 71, e.g. a beverage concentrate, to be combined with a base liquid, e.g. carbonated water, for the preparation of a liquid product, e.g. a beverage.

As can be seen the cartridge 70 has, or may have, many features already discussed with reference to the other examples. These features will not be discussed again as the skilled person will appreciate the corresponding features and functionality thereof.

The molded plastic cartridge body 72 has a bottom with a flexing portion 73 surrounding the lower end of the column 75 and, as preferred, a non-flexing portion 74 surrounding the flexing portion 73. As is preferred the column 75 has a lower portion that protrudes below the flexing bottom portion 74 of the bottom more preferably with the flexing portion in initial position forming a raised bulb into the cartridge.

The body 72 further has a circumferential wall 76 and delimits a reservoir that is filled with a single serve portion of a liquid ingredient.

The top has an aperture in communication with the reservoir, primarily used for filling the reservoir with liquid ingredient.

The filling aperture is hermetically sealed by a top sealing film 77.

As discussed already the column 75 has a portion that projects upwards from the bottom to an upper side of the column, which, as preferred, is sealed to the top sealing film. Possibly the top sealing film has a hole there, so that it is not necessary for the lance 120 to pierce the top sealing film. The same hole could also be present in other examples discussed herein, e.g. with the addition that the top sealing film is property sealed to the top end of the column or tubular valve member.

Channel 75a extends through the column 75 from an inlet at a top end thereof to an aperture at the bottom side of the cartridge body, that is here delimited by the lower protruding portion of the column.

The column 75 is movable downwards by a force exerted thereon relative to the top of the body, e.g. relative to the upper edge of a circumferential wall of the body, between a higher initial position (FIGS. 25,26) and a lower dispensing position (FIGS. 27, 28).

The base liquid feed lance 120 is connectable to the inlet of the channel in the column, so that the base liquid can be fed into the channel 75a and exit the cartridge via the aperture in the bottom of the cartridge.

The cartridge body is provided with one or more dispensing passages 80 arranged to dispense the liquid ingredient from the reservoir, which one or more dispensing passages have one or more dispensing passage outlets 81 arranged so that liquid ingredient emerging therefrom adjoins a base liquid stream emerging from the aperture at the bottom side of the channel 75a.

The cartridge 70 has a bottom sealing film 92, which is placed along the side of the bottom and hermetically seals at least one or more outlets 81 of the one or more dispensing passages 80. This bottom sealing film 92 is secured to the cartridge at one or more locations remote from the one or more outlets, here to the non-flexing part 74 of the bottom.

The bottom sealing film 92 is adapted to rupture and/or to tear away from the one or more outlets due to the column being moved downwards to its lower dispensing position, thereby opening the dispensing channel outlets 81.

As is illustrated it is preferred for the bottom sealing film to have a hole 93 therein aligned with the aperture of the channel 75a from which the base liquid emerges, so that the film 92 will not cause an undue disturbance of the outflow of said base liquid.

It will be appreciated that the design discussed with reference to FIGS. 25-28 does not require the presence of a valve member 70 as the film 92 keeps the outlets 81 closed until the column 75 is moved downwards. Yet, in an embodiment, such a valve member 70 may still be provided, in which case the film 92 mainly will serve to counter an ingress of matter into the dispensing passages. The latter can of course also be counter by packaging the cartridge in an outer envelope, e.g. a sealed sachet containing one or more cartridges which can also be done for any other cartridge discussed herein.

Reference numeral 77a again indicates the possibility to establish a gas pressure within the reservoir in order to assist the dispensing of liquid ingredient from the cartridge, e.g. as discussed in detail herein.

FIG. 29 schematically shows a beverage dispensing apparatus 200 with the cartridge 50 of FIG. 25 in opened condition.

The apparatus has a housing 205 and a holder 210 for the cartridge, here a drawer, for accommodating and retaining the cartridge 50 at a dispensing location in the apparatus. The dispensing location is directly above the support 215 for a drinking glass 216.

The apparatus 200 comprises an air pump 230 and a pressurization dome member 240 having along a periphery thereof an outer gas seal that is adapted to sealingly engage the disposable cartridge 50 around a location where the top sealing film is pierced to allow entry of pressurized air from the air pump into the reservoir.

A base liquid feed lance 220 is integrated with the dome member 240 as a reciprocating unit, here vertically, driven by operable displacement device 250, here with an excenter mechanism and an electric motor, which is adapted to produce a movement of the dome member 240 and lance 220 relative to the cartridge 50 that is held in the holder 210.

When the displacement device 250 is operated the lance 220 connects to the channel in the column of the cartridge 50. Also—upon further motion of the lance 220—the column is pressed downward to its dispensing position and in the process the protruding foot portion of the column is made to protrude into and through the premade hole in the bottom sealing film.

The apparatus 200 has a water inlet 260 to be connected to a water mains. If desired the apparatus may comprise a water filter to filter the water flowing into the apparatus.

Reference numeral 265 denotes a water chiller device to chill the water, e.g. to a temperature between 2 and 10 Celsius.

The outlet of the water chiller device 265 is connected, via valve assembly 266, on the one hand directly to the lance 220 and on the other hand to a carbonator 270, e.g. an inline or tankless carbonator. A CO2 bottle 275 is also connected to the carbonator 270 so that the CO2 can be dissolved in the chilled water and then fed to the lance 220.

Reference numeral 280 denotes a flow through water heater adapted to provide hot water to the lance 220. The flow thereof is controlled by hot water valve 281.

Reference numeral 300 denotes a temperature sensor that is adapted to sense the temperature of the cartridge 50, e.g. when located at the dispensing location in the apparatus.

The sensor 330 is connected to a gas pressure control device 310 which controls the operation of the air pump 230, e.g. so as to allow for a temperature dependent control of the air pressure to which the liquid ingredient in the reservoir of the cartridge is subjected.

In embodiments the air pump 230 is adapted to create an air pressure of between 0.5 and 2.5 bars above the atmospheric pressure. In embodiments the air pump 230 will create a predetermined air pressure dependent on a readable indication on the cartridge, e.g. by reading a barcode, preferably said pressure being constant over a dispensing cycle.

In embodiments a dispensing cycle for a glass of beverage, e.g. of about 250 ml, will take between 15 and 30 seconds.

In embodiment the volume ratio between the liquid ingredient and the base liquid may be between 1:4 and 1:10. For example a 50 ml volume of liquid ingredient in the reservoir is combined with 200-250 ml of carbonated water to fill a drinking glass.

In an embodiment the dispensing flow rate of the liquid ingredient from the reservoir is substantially uniform over the dispensing cycle of the base liquid, e.g. about 2-3 ml per second.

In an embodiment the dispensing apparatus is embodied to receive two cartridges at two side by side dispensing locations, e.g. in a two cavity holder, e.g. a drawer with two cavities. Preferably, for each dispensing locations there is an independently controllable operable displacement device as well as independent control of gas pressurization and of the supply of base liquid, so that effectively two apparatuses are combined in a single housing.

In an embodiment the apparatus is able to create a beverage on the basis of two cartridges loaded simultaneous into the apparatus, e.g. one cartridge containing a coffee liquid ingredient and the other cartridge containing a milk ingredient, e.g. to make a cappuccino.

The present invention further relates to cartridges, systems, dispensing apparatuses, and/or method according to the clauses below:

1. A disposable cartridge filled with a single serve portion of a liquid ingredient to be combined with a base liquid for the preparation of a liquid product, e.g. a liquid food product suitable for human consumption, e.g. a beverage concentrate to be combined with water, e.g. carbonated water, for the preparation of a beverage, the disposable cartridge comprising:

a cartridge body, e.g. molded of plastic, e.g. biodegradable plastic, with a bottom and a top, the body delimiting a reservoir that is filled with a single serve portion of a liquid ingredient, wherein the top has an aperture in communication with said reservoir, which aperture is hermetically sealed by a top sealing film, wherein the cartridge body further comprises a vertically extending bore which extends to an aperture in the bottom of the cartridge body, wherein a tubular valve member is movable, e.g. slidable, arranged in the bore, through which valve member a channel extends from an inlet at a top end of the valve member to an outlet at a bottom end of the valve member, wherein cartridge body is provided with one or more first dispensing passages between the reservoir and the bore, wherein the tubular valve member is provided with one or more second dispensing passages, wherein—in a sealing position of the valve member relative to the bore—the one or more second dispensing passages in the tubular valve member are out of register with the one or more first dispensing passages, such that the reservoir is closed, and wherein—in a dispensing position of the valve member relative to the bore—the one or more second dispensing passages in the valve member register with the one or more first dispensing passages, such that the reservoir is opened, wherein the valve member is movable by a force exerted thereon by said base liquid feed lance in order to move from said sealed position to said dispensing position, thereby allowing dispensing of said liquid ingredient from the reservoir, and wherein a base liquid feed lance is connectable to the inlet of the channel in the valve member, so that the base liquid can be fed into the channel and exit the cartridge via one of the outlet of the valve member and the aperture in the bottom of the cartridge, wherein, preferably, said one or more second dispensing passages are arranged such that the dispensed liquid ingredient is combined with the base liquid within the channel or at or near the outlet of the channel.

2. A disposable cartridge according to clause 1, wherein the valve member has an exterior side and an interior side that delimits the channel, and wherein the one or more second dispensing passages are embodied as one or more dispensing grooves in the exterior side of the valve member, said one or more dispensing grooves having a groove outlet from which the liquid ingredient is dispensed.

3. A disposable cartridge according to clause 2, wherein between three and six groove outlets are disposed around a lower end portion of the valve member.

4. A disposable cartridge according to clause 1, wherein the valve member has an exterior side and an interior side that delimits the channel, and wherein the one or more dispensing passages are embodied to extend between said exteriors side and interior side of the valve member.

5. A disposable cartridge according to any of the preceding clauses, wherein the outlet of the valve member forms the dispensing outlet for the base liquid or, in the embodiment of claim 4, the combined base liquid and liquid ingredient.

6. A disposable cartridge filled with a single serve portion of a liquid ingredient to be combined with a base liquid for the preparation of a liquid product, e.g. a liquid food product suitable for human consumption, e.g. a beverage concentrate to be combined with water, e.g. carbonated water, for the preparation of a beverage, the disposable cartridge comprising:
 a cartridge body, e.g. molded plastic body, with a bottom and a top, the body delimiting a reservoir that is filled with a single serve portion of a liquid ingredient,
 wherein the top has an aperture in communication with said reservoir, which aperture is hermetically sealed by a top sealing film,
 wherein the cartridge body further comprises a column having a portion that projects upwards from the bottom to an upper side of the column,
 wherein a vertically extending channel extends through the column from an inlet at a top end thereof to an aperture in the bottom of the cartridge body,
 wherein the bottom has a flexible portion adjacent, e.g. around the column, such that the column is movable downwards by a force exerted thereon relative to the top of the body, e.g. an upper edge of a circumferential wall of the body, between a higher initial position and a lower dispensing position,
 wherein a valve member is arranged within the cartridge and outside of the column, which valve member is stationary arranged within the cartridge so as to be movable, e.g. slidable, relative to the column when the column is moved from its higher initial position to its lower dispensing position,
 wherein cartridge body is provided with one or more dispensing passages arranged to dispense the liquid ingredient from the reservoir,
 wherein—in the higher initial position of the column—the valve member closes the one or more dispensing passages, such that the reservoir is closed,
 and wherein—in the lower dispensing position of the column—the valve member has moved away from the one or more dispensing passages, such that the reservoir is opened,
 and wherein a base liquid feed lance is connectable to the inlet of the channel in the column, so that the base liquid can be fed into the channel and exit the cartridge via the aperture in the bottom of the cartridge,
 wherein, preferably, said one or more dispensing passages are arranged such that the dispensed liquid ingredient is combined with the base liquid within the channel or at or near the outlet of the channel.

7. A disposable cartridge according to any of the preceding clauses, wherein the top sealing film is pierceable so as to allow for introduction of pressurized gas into the reservoir in order to pressurize the liquid ingredient therein so as to assist dispensing thereof via the one or more dispensing passages when the valve member is in the position wherein the one or more dispensing passages are open.

8. A disposable cartridge according to any of the preceding clauses, wherein:
 a) the bore and the valve member are arranged underneath the top sealing film with a portion of the top sealing film covering and sealing the inlet of the valve member, or
 b) wherein the top of the column is arranged underneath the top sealing film with a portion of the top sealing film covering and sealing the inlet of the channel in the column,
 and wherein the base liquid feed lance is pierceable through said portion of the top sealing film to feed base liquid to said inlet.

9. A disposable cartridge according to any of the clauses, wherein the cartridge body comprises one or more piercing members arranged underneath the top sealing film, so that pressing the top sealing film downwards, e.g. by the base liquid feed lance, causes said one or more piercing members to engage the top sealing film and the locally rupture the top sealing film thereby providing one or more holes that allow for introduction of pressurized gas into the reservoir in order to pressurize the liquid ingredient therein so as to assist dispensing thereof via the dispensing passages, for example wherein the one or more piercing members are embodied as one or more integrally molded spike formations.

10. A disposable cartridge according to clause 2, preferably for use with gas pressurized assisted dispensing of liquid ingredient from the reservoir, wherein the one or more discharge grooves on the exterior side of the valve member each have a collector groove portion, which in the dispensing position of the valve member, acts as receptacle for liquid ingredient, e.g. said liquid ingredient being jetted from an associated first dispensing passage under the influence of the pressurization of said liquid ingredient by pressurized gas, and wherein a further portion of said groove adjoins said collecting portion so as to allow said liquid ingredient to overflow said collector portion and then flow downwards towards an outlet of said groove.

11. A disposable cartridge according to clause 1, wherein the channel in the valve member or in the column has an upper portion with a first diameter and an adjoining lower portion extending up to said aperture or outlet, said lower portion and outlet having a second diameter,
 wherein the first diameter is greater than said second diameter, and wherein the base liquid feed lance has an insertion portion adapted to be inserted into said upper portion of the channel, wherein said feed lance has an internal feed channel therein having a feed channel diameter substantially equal to said second diameter, e.g. between 0.9 and 1.1 times the second diameter, thereby avoiding undue constriction and/or expansion of the flow of base liquid when passing from the feed lance into the second portion of the channel.

12. A disposable cartridge according to clause 1, e.g. also according to clause 11, wherein the bore for the tubular valve member has an upper portion with a first diameter and an adjoining lower portion with a second diameter smaller than said first diameter, and wherein the exterior of the valve member has an upper portion with a diameter so as to slidably fit in said upper portion of the bore and a lower portion so as to slidably fit in said lower portion of the bore.

13. A disposable cartridge according to clause 1, wherein the valve member and the bore—at least in the sealed position of the valve member—form one or more seals between them, e.g. in an embodiment according to clause 4 a seal between them that shields the one or more dispensing passages from the atmosphere.

14. A disposable cartridge according to clause 1, wherein the cartridge body is a rigid body with the bottom being rigid and maintaining its shape when the valve member is moved between its sealing position and dispensing position, e.g. moved vertically downward between said positions.

15. A disposable cartridge according to any of the clauses, wherein the cartridge body comprises a column, e.g. a column that is integrally molded with a portion of the bottom, e.g. a central portion of the bottom, which column projects upwards from the bottom to an upper end of the central column, through which column the bore extends from the upper end of the column and ends in said aperture in the bottom.

16. A disposable cartridge according to any of the clauses, wherein the cartridge body is an injection molded monolithic plastic body.

17. A disposable cartridge according to any of the preceding clauses, in which the cartridge has a bottom sealing film, which is placed along the underside of the bottom to hermetically seal the aperture and/or the outlet of the one or more dispensing passages, and, preferably, wherein the valve member is movable vertically downward from said sealed position to said dispensing position or wherein the column is movable downward to the lowered dispensing position thereof, and wherein the bottom sealing film is pierceable or breakable and is placed so as to be engaged and pierced or broken by the motion of the valve member or of the column when the valve member or column is moved down, said piercing or breaking of the bottom sealing film causing opening of said outlet of the channel of the valve member and/or of the aperture, and/or of the one or more dispensing openings.

18. A disposable cartridge according to clauses 1, in which the top end of the valve member rests against or is sealed to the top sealing film when the valve member is in the sealing position or wherein, in the embodiment of clause 6, the top end of the column rests against or is sealed to the top sealing film.

19. A disposable cartridge according to any of the clauses, in which the cartridge body forms a supporting surface of the cartridge, which supporting surface lies at a distance below the bottom, e.g. below—when present—a bottom sealing film, so that the bottom or bottom sealing film lies higher than any bearing surface when the cartridge is placed on it.

20. A disposable cartridge according to any of the clauses, wherein the cartridge body has a circumferential wall having an upper rim bounding an opening, wherein a top sealing film is fixed to said upper rim, e.g. embodied as an outwardly projecting flange, e.g. said radially projecting flange being embodied to support the cartridge on a bearing surface of a dispensing device.

21. A disposable cartridge according to clauses 1, wherein the valve member is provided with one or more snap portions adapted to form a snap fit as the valve member is moved into the dispensing position thereof.

22. A disposable cartridge according to any of the preceding clauses, wherein the outlet of the channel has a diameter between 6 and 10 millimeter, e.g. about 8 millimeter.

23. A disposable cartridge according to clauses 1, in which the cartridge body has a circumferential wall around the perimeter of the bottom and wherein the bore is concentric relative to an axis of the circumferential wall of the cartridge.

24. A disposable cartridge filled with a single serve portion of a liquid ingredient to be combined with a base liquid for the preparation of a liquid product, e.g. a liquid food product suitable for human consumption, e.g. a beverage concentrate to be combined with water, e.g. carbonated water, for the preparation of a beverage, the disposable cartridge comprising:

a cartridge body with a bottom and a top, the body delimiting a reservoir that is filled with a single serve portion of a liquid ingredient, wherein the top has an aperture in communication with said reservoir, which aperture is hermetically sealed by a top sealing film, wherein the cartridge body further comprises a column having a portion that projects upwards from the bottom to an upper side of the column, wherein a channel extends through the column from an inlet at a top end thereof to an aperture at the bottom side of the cartridge body, wherein the bottom has a flexible portion adjacent, e.g. around the column, such that the column is movable downwards by a force exerted thereon relative to the top of the body, e.g. an upper edge of a circumferential wall of the body, between a higher initial position and a lower dispensing position, and wherein a base liquid feed lance is connectable to the inlet of the channel in the column, so that the base liquid can be fed into the channel and exit the cartridge via the aperture in the bottom of the cartridge, wherein cartridge body is provided with one or more dispensing passages arranged to dispense the liquid ingredient from the reservoir, which one or more dispensing passages have one or more dispensing passage outlets arranged so that liquid ingredient emerging therefrom adjoins a base liquid stream emerging from the aperture at the bottom side of the channel, and wherein the cartridge has a bottom sealing film, which is placed along the side of the bottom and hermetically seals at least one or more outlets of the one or more dispensing passages, said bottom sealing film being secured to the cartridge at one or more locations remote from the one or more outlets, wherein the bottom sealing film is adapted to rupture and/or to tear away from the outlets due to the column being moved downwards to its lower dispensing position, thereby opening the dispensing channel outlets.

25. A disposable cartridge filled with a single serve portion of a liquid ingredient to be combined with a base liquid for the preparation of a liquid product, e.g. a liquid food product suitable for human consumption, e.g. water, e.g. carbonated water, for the preparation of a beverage, the disposable cartridge comprising:

a body with a bottom having an underside and with a circumferential wall, an upper edge of the circumferential wall bounding a filling aperture, wherein the filling aperture of the cartridge is hermetically sealed by a top sealing film, a circumference of the top sealing film being fixed on the upper edge, wherein the bottom has an aperture, the body further comprising a column, e.g. integrally molded with a portion of the bottom, e.g. a central portion, the column projecting upwards from the bottom to an upper end of the column, through which column a bore extends from the upper end of the column and ending in said aperture in the bottom, wherein the body bounds a reservoir filled with said liquid ingredient between said column and the circumferential wall, wherein a tubular valve member is slidably arranged in the column, through which valve member a channel extends from an inlet at a top end of the valve member to an outlet at a bottom end of the valve member, wherein the column is provided with one or more first dispensing passages between an exterior of the central column and the bore, wherein the tubular valve member is provided with one or more second dispensing passages, wherein—in a raised sealing position of the valve member relative to the column—the one or more second dispensing passages in the valve member are out of register with the one or more first dispensing passages in the column, such that the reservoir is closed, and wherein—in a lower dispensing position of the valve member relative to the column—the one or more second dispensing passages in the valve member register with the one or more first dispensing passages in the column, such that the reservoir is opened, wherein the top sealing film is pierceable, so that a base liquid feed lance can be pierced through the top sealing film and connected to the inlet of the channel in the valve member, so that the base liquid can be fed into the channel, wherein the valve member is movable downwards by a force exerted thereon by said base liquid feed lance in order to move from said sealed position to said lower dispensing position, thereby opening said reservoir and allowing dispensing of said liquid ingredient from the reservoir via said first and second dispensing channels, wherein, preferably, said one or more second dispensing passages are arranged such that the dispensed liquid ingredient is combined with the base liquid within the channel or at or near the outlet of the channel.

26. System for the preparation of a liquid product, e.g. a liquid food product, e.g. a beverage, which system comprises:

a) a disposable cartridge according to one or more of the preceding clauses and/or as disclosed herein, b) a dispensing apparatus, e.g. a beverage dispensing apparatus, the apparatus being at least provided with:

a holder for accommodating and retaining the cartridge at a dispensing location in the device, a base liquid feed assembly with a base liquid feed lance disposed at the dispensing location, which lance is embodied to connect to the channel of the valve member or of the column of the cartridge, e.g. whilst piercing through the top sealing film of the cartridge, so that base liquid can be fed into the channel, wherein the dispensing apparatus has an operable displacement device which is adapted to produce a movement of the holder for the cartridge and the base liquid feed lance relative to each other, so that when the displacement device is operated the lance connects to the channel, for example—when a valve member is present in the cartridge—the base liquid feed lance causing a relative motion that moves the valve member into a dispensing or opened position thereof, e.g. pressing the valve member downwards from the raised sealing position to the lower dispensing position thereof or moving the column down relative to a stationary valve member, or causing a bottom sealing film of the cartridge—when present—to rupture and/or tear away from one or more dispensing passage outlets initially sealed by said bottom sealing film, and thereby allowing the dispensing from the cartridge.

27. System according to clause 26, in which the liquid feed assembly is equipped for feeding in water as the base liquid, e.g. carbonated water, e.g. selectively carbonated and non-carbonated water.

28. System according to clause 26, in which the liquid feed lance is stationary mounted in the device, and in which the displacement device is equipped to move the holder towards the lance and away from it, in such a way that in the process the lance connects to the channel of the valve member.

29. System according to clause 26, in which the lance is disposed so as to be movable and is movable by means of a corresponding displacement device of the apparatus.

30. System according to any of clauses 26-29, in which the holder for the cartridge is equipped to accommodate and retain the cartridge in a substantially horizontal position with the bottom downwards, the holder having an aperture below the bottom of the cartridge in such a way that during dispensing of the liquid product said product remains clear of the holder.

31. System according to clause 30, in which at a distance below the dispensing location of the holder the device has a standing place for a mug or other receptacle, e.g. a drinking glass.

32. System according to any of clauses 26-31, in which the apparatus is provided with a pressurized gas source, preferably a pressurized air source, e.g. an air pump, and wherein the apparatus is adapted to bring said pressurized gas source in direct communication with the reservoir of the disposable cartridge so as to allow said liquid ingredient therein to be pressurized by said gas thereby assisting the dispensing thereof from the reservoir when said valve member has been brought into said dispensing position thereof.

33. System according to clauses 32, wherein the device comprises a pressurization dome member having along a periphery thereof an outer gas seal that is adapted to sealingly engage the disposable cartridge around a location where the top sealing film is pierced to allow entry of pressurized gas into the reservoir, e.g. the outer gas seal being embodied to seal onto an upper end of a circumferential wall of the disposable cartridge, and wherein the pressurized gas source is connected the said dome member so as to allow feeding of pressurized gas beneath said dome member and wherein the outer gas seal thereof sealingly engages the disposable cartridge and the top sealing film has been pierced.

34. System according to clause 33, wherein said base liquid feed lance protrudes from said dome member.

35. Method for preparation of a liquid product, e.g. a carbonated beverage, wherein use is made of a cartridge and/or system and/or apparatus according to any of the preceding clauses.

The invention claimed is:

1. System for the preparation of a liquid food product, which system comprises:

a) a disposable cartridge filled with a single serve portion of a liquid ingredient to be combined with a base liquid for the preparation of a liquid product, the disposable cartridge comprising:

a cartridge body with a bottom and a top, the body delimiting a reservoir that is filled with a single serve portion of a liquid ingredient, wherein the cartridge body has an aperture in communication with said reservoir, which aperture is hermetically sealed by a sealing film, said sealing film having a portion that covers said reservoir, wherein cartridge body is provided with one or more dispensing passages arranged to dispense the liquid ingredient from the reservoir, b) a dispensing apparatus, the apparatus comprising:
a holder adapted to accommodate and retain the disposable cartridge at a dispensing location in the apparatus,
a pressurized gas source, wherein the apparatus is adapted to bring said pressurized gas source in direct communication with the reservoir of the disposable cartridge so as to allow said liquid ingredient therein to be pressurized by said gas thereby assisting the dispensing thereof from the reservoir via said one or more dispensing passages, wherein the system is adapted to create one or more openings in said portion of the sealing film that covers the reservoir, and wherein the dispensing apparatus further comprises a pressurization dome member having a peripheral gas seal, which is adapted to sealingly engage the disposable cartridge around a location where said one or more openings are created in said sealing film to allow entry of said pressurized gas into the reservoir, and in that the pressurized gas source is connected to said dome member and is adapted to feed pressurized gas beneath said dome member within the contour of the peripheral gas seal sealingly engaging the disposable cartridge, so as to allow said liquid ingredient in said reservoir to be pressurized by said gas via the one or more openings in said sealing film, thereby assisting the dispensing of the liquid ingredient from the reservoir via said one or more dispensing passages.

2. System according to claim 1, wherein the cartridge has a circumferential wall with an upper end, said upper end bounding said aperture closed by the sealing film, and wherein the peripheral gas seal of the dome member is embodied to seal onto said upper end.

3. System according to claim 1, wherein the dispensing apparatus further comprises:
a base liquid feed assembly with a base liquid feed member disposed at the dispensing location, which base liquid feed member is embodied to connect to a channel of the cartridge, so that base liquid can be fed into the channel,
wherein the dispensing apparatus has an operable displacement device which is adapted to produce a movement of the holder for the cartridge and the base liquid feed member relative to each other, so that when the displacement device is operated the base liquid feed member connects to the channel.

4. System according to claim 3, wherein the base liquid feed member is a base liquid feed lance which protrudes from the pressurization dome member, preferably within the contour of the peripheral gas seal.

5. System according to claim 3, wherein the cartridge body comprises a column which has a portion that projects upwards from the bottom, wherein the channel extends through the column from an inlet of the channel at a top end of the column, to a dispensing aperture at the side of the bottom of the cartridge, wherein the base liquid feed member is adapted to connect to said inlet of the channel so that base liquid fed into the channel travels through the channel and exits the channel via the dispensing aperture.

6. System according to any one of claim 3, wherein the base liquid feed member is arranged within the contour of the peripheral gas seal and is adapted to sealingly engage the channel, so as to act as gas seal that prevents entry of pressurized gas into the channel.

7. System according to claim 1, wherein the peripheral gas seal of the dome member is a lip seal member having an inwardly directed resilient lip portion engaging the sealing film, preferably at or near the contour of the aperture in the cartridge body, said inwardly directed resilient lip portion being exposed to said pressurized gas so as to aid in the sealing engagement with the cartridge.

8. System according to claim 2, wherein the cartridge body comprises a column which is movable inwards from an initial position to a dispensing position, which column is sealed to said sealing film, wherein the channel extends through the column from an inlet of the channel at a top end of the column,
wherein the base liquid feed member is adapted to connect to said inlet of the channel and to engage the column allowing to feed said base liquid into the channel and to move said column to said dispensing position by operation of said operable displacement device.

9. System according to claim 8, wherein the portion of the sealing film covering the reservoir is provided with one or more premade score lines, which are embodied such that pressing the column inward, to said dispensing position causes said one or more premade score lines to rupture thereby providing said one or more openings that allow said introduction of pressurized gas into the reservoir in order to assist dispensing of said liquid ingredient.

10. System according to claim 1, wherein the cartridge is provided with one or more piercing members that are arranged underneath the portion of the sealing film that covers the reservoir, so that pressing the sealing film inward, causes said one or more piercing members to engage the sealing film and locally rupture the sealing film thereby providing one or more openings that allow said introduction of pressurized gas into the reservoir in order to assist dispensing of said liquid ingredient.

11. System according to claim 10, wherein the cartridge body comprises a column which is movable inwards, e.g. downwards, from an initial position to a dispensing position, which column is sealed to said sealing film, wherein the channel extends through the column from an inlet of the channel at a top end of the column,
wherein the base liquid feed member is adapted to connect to said inlet of the channel and to engage the column allowing to feed said base liquid into the channel and to move said column to said dispensing position by operation of said operable displacement device,
wherein said one or more piercing members locally rupture the sealing film when the column is move to said dispensing position.

12. System according to at least claim 5, wherein the cartridge has flexible bottom portion so that the column is movable downwards from a higher initial position to a lower dispensing position by means of the base liquid feed member, and wherein the column has a dispensing aperture for the base liquid at the side of the bottom, and wherein the one or more dispensing passage outlets of the cartridge are arranged at said bottom side of the cartridge and spaced from the dispensing aperture so that liquid ingredient emerges from said one or more dispensing passage outlets as a flow or flows distinct from the stream of base liquid emerging from the dispensing aperture of the channel, and wherein the one or more dispensing passage outlets are arranged so that liquid ingredient emerging therefrom adjoins the outside of the base liquid stream that has emerged from the dispensing aperture.

13. System according to claim 12, wherein the one or more dispensing passage outlets of the cartridge are arranged at a height that corresponds to the height of the dispensing aperture or a height above the dispensing aperture.

14. System according to claim 12, wherein the one or more dispensing passage outlets are initially sealed by a bottom sealing film of the cartridge, and wherein the motion of the column to said lower dispensing position causes the bottom sealing film of the cartridge to rupture and/or tear away from one or more dispensing passage outlets initially sealed by said bottom sealing film, and thereby to allow the dispensing from the cartridge.

15. System according to claim 1, wherein the one or more dispensing passage outlets are arranged so that the liquid ingredient emerging therefrom adjoins the outside of the base liquid stream that has emerged from the dispensing aperture as an annular shroud around said base liquid stream.

16. System according to claim 15, wherein the dispensing apparatus is adapted to pressurize the liquid ingredient in the reservoir so that the one or more streams of liquid ingredient emerging from the one or more dispensing passage outlets flow as a slow flow along with the base liquid stream emerging from the dispensing aperture of the channel, which slow flow adjoins the outside of the base liquid stream.

17. System according to claim 1, wherein the one or more dispensing passages are embodied as flow resistor for the liquid ingredient passing there through.

18. System according to claim 1, wherein an inlet of a dispensing passage is oriented at an angle relative to the adjoining portion of the dispensing passage such that a jet of liquid ingredient emerging from the inlet due to the gas pressurization of the liquid ingredient collides against a wall of said adjoining portion of the dispensing passage thereby reducing, preferably annihilating, the speed of said jet.

19. System according to claim 1, wherein an inlet of a dispensing passage is embodied to cause the liquid ingredient, due to the gas pressurization, to emerge from said inlet as a jet into an adjoining portion of the dispensing passage, and wherein dispensing passage is embodied to reduce the speed of said jet of liquid ingredient so that the liquid ingredient streams down to the dispensing passageway slowly from the dispensing passageway outlet.

20. System according to claim 1, wherein the cartridge or a lower portion of a column of the cartridge that protrudes below the bottom of the cartridge has a dispensing aperture for a stream of base liquid, and wherein the cartridge body is provided with a series of dispensing passage outlets which are arranged in a circular arrangement around said base liquid dispensing aperture so as to dispense the liquid ingredient as an annular shroud around the base liquid stream emerging from the dispensing aperture.

21. System according to claim 1, wherein the holder is a drawer comprising a cavity for receiving the cartridge therein, which drawer is movable into a housing of the apparatus so that the cartridge is movable into the dispensing location, and wherein the operable displacement device is adapted to move the pressurization dome member up and down relative to housing so as to sealingly engage—in a lower position of the dome member—the peripheral gas seal with the cartridge around a location where the sealing film is opened to allow entry of pressurized gas into the reservoir.

22. System according to claim 1, wherein the disposable cartridge comprises:
a cartridge body with a bottom and a top, the body delimiting a reservoir that is filled with a single serve portion of a liquid ingredient,
wherein the top has an aperture in communication with said reservoir, which aperture is hermetically sealed by a top sealing film,
wherein the cartridge body further comprises a column having a portion that projects upwards from the bottom to an upper side of the column,
wherein a channel extends through the column from an inlet at a top end thereof to an aperture at the bottom side of the cartridge body,
wherein the bottom has a flexible portion adjacent, such that the column is movable downwards by a force exerted thereon relative to the top of the body, between a higher initial position and a lower dispensing position,
and wherein a base liquid feed lance of the dispensing apparatus is connectable to the inlet of the channel in the column, so that the base liquid can be fed into the channel and exit the cartridge via the aperture in the bottom of the cartridge,
wherein cartridge body is provided with one or more dispensing passages arranged to dispense the liquid ingredient from the reservoir, which one or more dispensing passages have one or more dispensing passage outlets arranged so that liquid ingredient emerging therefrom adjoins a base liquid stream emerging from the aperture at the bottom side of the channel,
and wherein the cartridge has a bottom sealing film, which is placed along the side of the bottom and hermetically seals one or more outlets of the one or more dispensing passages, said bottom sealing film being secured to the cartridge at one or more locations remote from the one or more outlets,
wherein the bottom sealing film is adapted to rupture and/or to tear away from the outlets due to the column being moved downwards to its lower dispensing position, thereby opening the dispensing channel outlets.

23. System according to claim 1, wherein the disposable cartridge comprises:
a body with a bottom having an underside and with a circumferential wall, an upper edge of the circumferential wall bounding a filling aperture,
wherein the filling aperture of the cartridge is hermetically sealed by a top sealing film, a circumference of the top sealing film being fixed on the upper edge,
wherein the bottom has an aperture,
the body further comprising a column, the column projecting upwards from the bottom to an upper end of the column, through which column a bore extends from the upper end of the column and ending in said aperture in the bottom,
wherein the body bounds a reservoir filled with said liquid ingredient between said column and the circumferential wall,
wherein a tubular valve member is slidably arranged in the column, through which valve member a channel extends from an inlet at a top end of the valve member to an outlet at a bottom end of the valve member,
wherein the column is provided with one or more first dispensing passages between an exterior of the central column and the bore,
wherein the tubular valve member is provided with one or more second dispensing passages,
wherein in a raised sealing position of the valve member relative to the column the one or more second dispensing passages in the valve member are out of register with the one or more first dispensing passages in the column, such that the reservoir is closed, and wherein in a lower dispensing position of the valve member relative to the column the one or more second dispensing passages in the valve member register with the one or more first dispensing passages in the column, such that the reservoir is opened, wherein the top sealing film is pierceable, so that a base liquid feed lance can be pierced through the top sealing film and connected to the inlet of the channel in the valve member, so that the base liquid can be fed into the channel, wherein the valve member is movable downwards by a force exerted thereon by said base liquid feed lance in order to move from said sealed position to said lower dispensing position, thereby opening said reservoir and allowing dispensing of said liquid ingredient from the reservoir via said first and second dispensing channels.

24. A method for the preparation of a liquid product, wherein use is made of a system according to claim 1, wherein the method comprises:

sealingly engaging the peripheral gas seal of the pressurization dome member with the disposable cartridge around a location where the sealing film is or will be opened to allow entry of pressurized gas into the reservoir, causing the sealing film to open, feeding pressurized gas beneath said dome member thereby pressurizing the liquid ingredient in the reservoir of the disposable cartridge by said gas thereby assisting the dispensing thereof from the reservoir via said one or more dispensing passages.

* * * * *